(12) United States Patent
Myers et al.

(10) Patent No.: US 9,500,328 B2
(45) Date of Patent: Nov. 22, 2016

(54) LIGHTING ASSEMBLY

(71) Applicant: PIXI LIGHTING, INC., Orange, CA (US)

(72) Inventors: J. Richard Myers, Pasadena, CA (US); Arthur B. Moore, Arcadia, CA (US)

(73) Assignee: Pixi Lighting, Inc., Irvine, CA (US)

( * ) Notice: Subject to any disclaimer, the term of this patent is extended or adjusted under 35 U.S.C. 154(b) by 264 days.

(21) Appl. No.: 14/246,823

(22) Filed: Apr. 7, 2014

(65) Prior Publication Data

US 2014/0313774 A1    Oct. 23, 2014

Related U.S. Application Data

(60) Provisional application No. 61/812,973, filed on Apr. 17, 2013.

(51) Int. Cl.
*F21V 7/04* (2006.01)
*F21V 33/00* (2006.01)
*F21V 5/00* (2015.01)
(Continued)

(52) U.S. Cl.
CPC .............. *F21K 9/61* (2016.08); *F21V 5/004* (2013.01); *F21V 5/005* (2013.01); *F21V 33/0012* (2013.01); *G02B 6/0083* (2013.01); *F21W 2131/301* (2013.01); *F21Y 2101/00* (2013.01); *F21Y 2105/00* (2013.01); *G02B 6/0053* (2013.01); *G02B 6/0073* (2013.01); *G02B 6/0086* (2013.01)

(58) Field of Classification Search
CPC ...... G02B 6/0068; G02B 6/0083; F21S 8/04
See application file for complete search history.

(56) References Cited

U.S. PATENT DOCUMENTS

| 3,892,959 A | 7/1975 | Pulles |
| 4,975,809 A | 12/1990 | Ku |
| 5,027,258 A | 6/1991 | Schoniger et al. |
| 5,276,591 A | 1/1994 | Hegarty |
| 5,375,043 A | 12/1994 | Tokunaga |

(Continued)

FOREIGN PATENT DOCUMENTS

| CN | 201225561 Y | 4/2009 |
| CN | 201513783 U | 6/2010 |

(Continued)

OTHER PUBLICATIONS

Office Action dated Sep. 21, 2015 corresponding to Chinese Patent Application No. 201280024002.3, 10 pages.

(Continued)

*Primary Examiner* — Andrew Coughlin
(74) *Attorney, Agent, or Firm* — Arthur Moore; Dentons US LLP

(57) ABSTRACT

The light fixture includes a frame, an optically transmissive panel assembly, a set of light emitting diodes (LEDs), and driving circuitry. The frame has a frame length measured along a length axis and a frame width measured along a width axis, wherein the frame length is greater than the frame width. The optically transmissive panel assembly receives light from the set of light emitting diodes (LEDs) and emits light from an emission area in a patterned luminous intensity, using patterning optics adjacent a light guide plate. The driving circuitry is disposed within the frame and is operatively coupled to the set of LEDs and to a power supply external to the light fixture. The driving circuitry may include a first circuitry segment disposed within a first edge channel of the frame, and a second circuitry segment disposed within a second edge channel of the frame.

19 Claims, 8 Drawing Sheets

(51) Int. Cl.
  *F21V 8/00* (2006.01)
  *F21W 131/301* (2006.01)
  *F21Y 105/00* (2016.01)
  *F21Y 101/00* (2016.01)

(56) References Cited

U.S. PATENT DOCUMENTS

| | | |
|---|---|---|
| 5,636,462 A | 6/1997 | Kleiman |
| 5,641,219 A | 6/1997 | Mizobe |
| 5,806,972 A | 9/1998 | Kaiser et al. |
| 6,042,243 A | 3/2000 | Grill et al. |
| 6,095,660 A | 8/2000 | Moriyama |
| 6,231,213 B1 | 5/2001 | Schmidt et al. |
| 6,641,283 B1 | 11/2003 | Bohler |
| 6,739,734 B1 | 5/2004 | Hulgan |
| 6,758,573 B1 | 7/2004 | Thomas |
| 6,840,646 B2 | 1/2005 | Cornelissen et al. |
| 6,880,963 B2 | 4/2005 | Luig |
| 6,997,576 B1 | 2/2006 | Lodhie |
| 7,015,987 B2 | 3/2006 | Wu et al. |
| 7,090,387 B2 | 8/2006 | Kohno |
| 7,172,324 B2 | 2/2007 | Wu |
| 7,201,488 B2 | 4/2007 | Sakamoto et al. |
| 7,236,155 B2 | 6/2007 | Han et al. |
| 7,374,327 B2 | 5/2008 | Schexnaider |
| 7,445,369 B2 | 11/2008 | Yu |
| 7,448,768 B2 | 11/2008 | Sloan et al. |
| 7,473,022 B2 | 1/2009 | Yoo |
| 7,547,112 B2 | 6/2009 | Kim |
| 7,563,015 B2 | 7/2009 | Tzung-Shiun |
| 7,570,313 B2 | 8/2009 | Wu |
| 7,583,901 B2 | 9/2009 | Nakagawa |
| 7,604,389 B2 | 10/2009 | Sakai |
| 7,708,447 B2 | 5/2010 | Tobler et al. |
| 7,722,221 B2 | 5/2010 | Chae |
| 7,726,617 B2 | 6/2010 | Zambelli |
| 7,766,536 B2 | 8/2010 | Peifer |
| 7,787,070 B2 | 8/2010 | Choi et al. |
| 7,825,892 B2 | 11/2010 | Lin et al. |
| 7,894,013 B2 | 2/2011 | Chung et al. |
| 7,918,598 B2 | 4/2011 | Peifer et al. |
| 8,029,293 B2 | 10/2011 | Janos et al. |
| 8,061,867 B2 | 11/2011 | Kim |
| D653,376 S | 1/2012 | Kong |
| 8,092,034 B2 | 1/2012 | Zarian et al. |
| 8,092,069 B2 | 1/2012 | Chuang et al. |
| 8,096,671 B1 | 1/2012 | Cronk |
| 8,136,958 B2 | 3/2012 | Verfuerth et al. |
| 8,167,627 B1 | 5/2012 | Janos |
| 8,915,636 B2 | 12/2014 | Araki et al. |
| 9,062,867 B2 | 6/2015 | Rodgers et al. |
| 9,068,704 B2 | 6/2015 | Burton et al. |
| 9,206,964 B2 | 12/2015 | Marsh et al. |
| 2004/0240230 A1 | 12/2004 | Kitajima |
| 2005/0082453 A1 | 4/2005 | Chuang |
| 2005/0174755 A1 | 8/2005 | Becker |
| 2005/0180172 A1 | 8/2005 | Jang |
| 2005/0219860 A1 | 10/2005 | Schexnaider |
| 2006/0022214 A1 | 2/2006 | Morgan |
| 2006/0158906 A1 | 7/2006 | Parker |
| 2006/0291238 A1 | 12/2006 | Epstein |
| 2006/0291241 A1 | 12/2006 | Wojtowicz et al. |
| 2007/0000849 A1 | 1/2007 | Lutz et al. |
| 2007/0047262 A1 | 3/2007 | Schardt |
| 2007/0076431 A1 | 4/2007 | Atarashi et al. |
| 2007/0097227 A1 | 5/2007 | Toyokawa |
| 2007/0115402 A1 | 5/2007 | Zhang et al. |
| 2007/0165424 A1 | 7/2007 | Sakai |
| 2007/0171670 A1 | 7/2007 | Zagar |
| 2007/0222914 A1 | 9/2007 | Kotchick et al. |
| 2007/0247414 A1 | 10/2007 | Roberts |
| 2007/0247842 A1 | 10/2007 | Zampini |
| 2007/0247870 A1 | 10/2007 | Sakai et al. |
| 2008/0013303 A1 | 1/2008 | Guarino |
| 2008/0101094 A1 | 5/2008 | Spada et al. |
| 2008/0231196 A1 | 9/2008 | Weng et al. |
| 2008/0297679 A1 | 12/2008 | Jung et al. |
| 2009/0097277 A1* | 4/2009 | Iwasaki ............... G02B 6/0091 362/628 |
| 2009/0147507 A1 | 6/2009 | Verfuerth et al. |
| 2009/0213589 A1 | 8/2009 | Peifer et al. |
| 2009/0316396 A1* | 12/2009 | Tsai ..................... F21K 9/00 362/235 |
| 2009/0323334 A1 | 12/2009 | Roberts et al. |
| 2010/0124064 A1 | 5/2010 | Ogawa et al. |
| 2010/0165241 A1 | 7/2010 | Kim et al. |
| 2010/0171145 A1 | 7/2010 | Morgan |
| 2010/0172138 A1 | 7/2010 | Richardson |
| 2010/0176742 A1 | 7/2010 | Lee et al. |
| 2010/0237798 A1 | 9/2010 | Wolf |
| 2010/0284185 A1 | 11/2010 | Ngai |
| 2010/0289428 A1 | 11/2010 | Frazier |
| 2010/0315833 A1* | 12/2010 | Holman ............... G02B 6/0028 362/607 |
| 2011/0068708 A1 | 3/2011 | Coplin et al. |
| 2011/0075414 A1 | 3/2011 | Van De Ven et al. |
| 2011/0149596 A1* | 6/2011 | Lv ..................... G02B 6/0073 362/607 |
| 2011/0279063 A1 | 11/2011 | Wang et al. |
| 2011/0291569 A1 | 12/2011 | Shin |
| 2012/0020109 A1 | 1/2012 | Kim et al. |
| 2012/0081889 A1 | 4/2012 | Frost et al. |
| 2012/0091919 A1 | 4/2012 | Tveit |
| 2012/0106177 A1 | 5/2012 | Blankestijn et al. |
| 2012/0182733 A1 | 7/2012 | Cho |
| 2012/0218746 A1 | 8/2012 | Winton |
| 2012/0287631 A1 | 11/2012 | Sheng |
| 2012/0320627 A1 | 12/2012 | Araki et al. |
| 2012/0328242 A1 | 12/2012 | Hesse |
| 2013/0038211 A1 | 2/2013 | Kang |
| 2013/0044512 A1 | 2/2013 | Araki et al. |
| 2013/0070455 A1 | 3/2013 | Tsui et al. |
| 2013/0258706 A1 | 10/2013 | Urtiga et al. |
| 2014/0240966 A1 | 8/2014 | Garcia et al. |
| 2014/0313780 A1 | 10/2014 | Myers |
| 2014/0376266 A1 | 12/2014 | Myers et al. |
| 2015/0049512 A1 | 2/2015 | Myers et al. |

FOREIGN PATENT DOCUMENTS

| | | |
|---|---|---|
| CN | 201628158 | 11/2010 |
| CN | 201724032 U | 1/2011 |
| DE | 202009007334 U1 | 9/2009 |
| DE | 102010006465 A1 | 8/2011 |
| DE | 102010008359 A1 | 8/2011 |
| DE | 202012103430 U1 | 9/2012 |
| EP | 1059484 A1 | 12/2000 |
| EP | 1906081 A1 | 4/2008 |
| EP | 2088835 A1 | 8/2009 |
| EP | 2131100 A1 | 12/2009 |
| EP | 1361391 A2 | 4/2010 |
| EP | 2270387 B1 | 9/2011 |
| EP | 2495490 A2 | 9/2012 |
| JP | 2004271734 A | 9/2004 |
| JP | 2004335426 A | 11/2004 |
| JP | 2006106212 A | 4/2006 |
| JP | 3140783 U | 4/2008 |
| JP | 2011-138731 A | 7/2011 |
| WO | 2009017117 A1 | 2/2009 |
| WO | 2009/102563 A1 | 8/2009 |
| WO | 2010133535 A1 | 11/2010 |
| WO | 2012/113005 A1 | 8/2012 |
| WO | 2012125605 A3 | 9/2012 |
| WO | 2012158894 | 11/2012 |
| WO | 2012158908 | 11/2012 |

OTHER PUBLICATIONS

English Translation of Office Action dated Sep. 21, 2015 corresponding to Chinese Patent Application No. 201280024002.3, 8 pages.

Office Action dated Oct. 30, 2015 corresponding to Chinese Patent Application No. 201280023544.9, 6 pages.

(56) References Cited

OTHER PUBLICATIONS

English Translation of Office Action dated Oct. 30, 2015 corresponding to Chinese Patent Application No. 201280024002.3, 9 pages.
Wilson, R., "Power Integrations LED driver is 88% efficient for 100W bulb replacement," ElectronicsWeekly.com, Sep. 2015, retrieved from the Internet: http:www.electronicsweekly.com/blost/led-luminaries/power-integrations-led-driver-is-889-efficient-for100w-bulb-replacement-2012-09/ [retrieved on Dec. 7, 2015], 3 pages.
"Think Lumens, Not Watts: Buying Light bulbs in the 21st Century," EarthLED, retrieved from the Internet: https://www.earthled.com/pages/lumens-watts-and-buying-lightbulbs-in-the-21st-century, [retrieved on Dec. 7, 2015], 5 pages.
"Lumination LED Luminaires—Recessed LED Troffer—ET Series," GE imagination at work, retrieved from the Internet: www.gelighting.com/LightingWeb/na/solutions/indorr-lighting/recessed/lumination-et-series.jsp, [retrieved on Dec. 2015], 8 pages.
Canadian Intellectual Property Office, Examiners's Report under Subsection 30(2) of the Patent Rules, Examination Report for Canadian patent application 2,835,213, mailed Apr. 22, 2015, 4 pages.
International Preliminary Report on Patentability dated Oct. 20, 2015 corresponding to International Patent Application No. PCT/US2014/033352, 11 pages.
International Preliminary Report on Patentability dated Oct. 20, 2015 corresponding to International Patent Application No. PCT/US2014/033953, 8 pages.
Communication and Annex from the Examining Division dated Sep. 17, 2015 corresponding to European Patent Application No. 12 726 949.6, 5 pages.
ATG Electronics Corp., "iBright Flat LED Panel", website description, undated; downloaded from http://www.atgelectroni cs.com/lighting/Illumination/LEDTroffer/Flat-LED- Panel.html on Apr. 25, 2013; 9 pages.
Delta Electronics, "General Lighting: LED Lighting Solutions", product brochure, undated; downloaded frpm http://www.delta.com.tw/product/rd/led/products/luminaire/lum_fl01.asp on Mar. 30, 2012; 2 pages.
Dongbu Lightec, "LED Light Panel Installation Guide", undated; downloaded from http://www.dongbulightec.ca/English/Products/LED_L_P_Tech.html on Mar. 30, 2012; 5 pages.
Dongbu Lightec, "LumiSheet Lamp", pamphlet from LIGHTFAIR International (LFI) on Apr. 23-25/2013; 9 pages.
ELumination, "Custom LED Light Panels", undated; downloaded from www.elumanation.com on Dec. 4, 2012; 1 page.
Energetic Lighting, "LED Panel Light", product features for ELEP2x250 and ELEP2x450, undated; downloaded from www.energeticlighting.com on Mar. 30, 2012; 1 page.
Enlight Corporation, "Ultraslim LED Panel Light", website description, undated; downloaded from http://twe.enlightcorp.com/ on Apr. 25, 2013; 2 pages.
Foshan Sunbay Opto Electronics Co., Ltd., "Super Thin and Driver Inside 300*300 22W LED Panel Light", undated; originally downloaded from http://sunbayled.en.made-in-china.com/product/vBxnWSXobmhY/China-Super-Thin-and-Driver-Inside-300-300-22W-LED-Panel-Light.html on Apr. 20, 2013; 3 pages.
GE Lighting Solutions, "GE Lighting Flat LED Panel", undated; downloaded on Jan. 16, 2012; 10 pages.
GE Lighting Solutions, "Lumination LED Luminaires—Troffer", undated; downloaded from http:/www.gelightingsolutions.com/Indoor/id-456789e/Lumination_LED_Luminaires_-_Troffer on Jul. 12, 2012; 2 pages.
GE Lighting Solutions, specification sheet for the 2x2 Edgelighting Fixture for troffer fixtures, pamphlet from LIGHTFAIR International (LFI) on May 17-19/2011; 1 page.
General Lighting Electronic Co., Ltd, LED Panel Light specifications for 60w 600x600, undated; originally downloaded from http://www.gl-leds.com/led-news/led-panel-1ight-60w-600x600-01.html on Jun. 6, 2011; 3 pages.

General Lighting Electronic Co., "LED Light Panel List", undated; originally downloaded from http://www.gl-leds.com/led-panel-light-list.html on Apr. 23, 2013; 2 pages.
Global Lighting Technologies Inc., "LED Edge Lighting", pamphlet from Lightfair International (LFI) on Apr. 23-25/2013; 12 pages.
Green Led Lighting Solutions Inc., "LED Light Panel: Ultra Thin LED Light Box (Built in Power Supply)", product brochure, undated; downloaded from www.ledlightpanel.com on Apr. 23, 2013; 1 page.
Intematix Corporation, "Customer Case Study—Tech Lighting Unilume: Innovation for Undercabinet Lighting", brochure of Intematix for its Intematix Chromalit™ remote phosphor LEDs technology, undated; downloaded from www.intematix.com on Mar. 19, 3013; 2 pages.
Luminousfilm.com, a Knema, LLC company, "LED Light Panels Information", website description, undated; originally downloaded from http://www.luminousfilm.com/led.htm on Mar. 19, 2013; 5 pages.
Maxim Lighting; website description of LED flat lights, undated; originally downloaded from http://www.maximlighting.com/ on Mar. 19, 2013; 2 pages.
Maxim Lighting, "CounterMax StarStrand Counter, Accent & Task Lighting Solutions", copyright 2012; originally downloaded from http://www.maximlighting.com/catalog_pdf.aspx?c: brochure &n=LMXBR01203.pdf on Mar. 19, 2013; pp. 1-5, 11-14; 10 pages.
MAXLITE, specification sheet for 2x4 flat light, pamphlet from LIGHTFAIR International (LFI) on May 17-19/2011 ; 1 page.
MAXLITE, advertisement for maxLED Flat Panel 2x2, 2x4, and 1x4 models, for Lightfair International (LFI) on May 17-19/2011; 5 pages.
Modular International Inc., "LED Panels", product brochure, undated; downloaded from http://www.modularinternational.com/literature.php on Mar. 6, 2009; 2 pages.
National Specialty Lighting, "LED Task Star", product brochure, undated; downloaded from http://www.nslusa.com/ on Mar. 19, 2013; 1 page.
Nicor Lighting, "T2LED 2x2 Troffer", product brochure, undated; downloaded from nicorlighting.com/uploads/ . . . /t2-led-2x2-troffer-l umen-mainenance.pdf on Apr. 25, 2013; 1 page.
Nicor Lighting, "2013 Catalog Multifamily, Assisted Living, & Hospitality Lighting Products", copyright 2013, pamphlet from Lightfair International (LFI) on Apr. 25-25/2013; pp. 1-4, 31; 7 pages.
Noke LED Lighting Technology Co., Ltd., "Ceiling Light 650x650mm", website description, undated; originally downloaded from http://www.nokeled.com/products/Ceiling-light-650x650mm.html on Jun. 11, 2012; 2 pages.
Patent Cooperation Treaty, "Invitation to Pay Additional Fees and, Where Applicable, Protest Fee", partial international search report for international application No. PCT/US2012/038338, mailed Sep. 19, 2012; 7 pages.
Patent Cooperation Treaty, "International Search Report", international search report for international application No. PCT/US2012/038338, Feb. 18, 2013; 7 pages.
Patent Cooperation Treaty, "Invitation to Pay Additional Fees and, Where Applicable, Protest Fee", partial international search report for international application No. PCT/US2012/038315, mailed Sep. 19, 2012; 9 pages.
Patent Cooperation Treaty, "International Search Report", international search report for international application No. PCT/US2012/038315, Feb. 13, 2013; 9 pages.
Rambus, "LED Light Bulbs", website description, Jan. 17, 2013; originally downloaded from http://www.rambus.com/us/technology/solutions/led-light-bulb/index.html?utm_source=Rambus+Contacts&utm_campaign=99dc5a0773-Technology_Bulb_Imerz_Launch1_17_2013&utm_medium=email on Feb. 12, 2013; 2 pages.
Shenzhen Borsche Electronic Co., Ltd., "LED Panel Light", product catalog, undated; originally downloaded from http://cnhidee.en.made-in-china.com/product-group/pqeQkYCcXtVK/LED-Panel-Light-catalog-1.html on Apr. 30, 2013; 3 pages.

(56) References Cited

OTHER PUBLICATIONS

Stellaray Technology Limited, "Flat LED Panel", published Mar. 19, 2012; downloaded from http://www.srleds.com/e/products/LED_Panel_Lights/led panel lights.html on Apr. 12, 2012; 26 pages.

Taiwan T-LUX Technology Co., Ltd, "BTHx Series Specification Sheet", Issued Oct. 12, 2010 and Modified Mar. 1, 2011; downloaded from http://www.t-lux.com.tw on Nov. 2, 2011; 7 pages.

Tech Lighting, a Generation Brands Company, "Unilume LED Undercabinet", product brochure and installation instructions, undated; downloaded on www.techlighting.com on Mar. 19, 2013; 6 pages.

Unity Opto Technology Co., Ltd., "Product Specification: UNi Ceiling Lighting_12020", Jan. 7, 2011; downloaded from http://www.unityopto.com.tw/ on Mar. 19, 2013; 5 pages.

Unity Opto Technology Co., Ltd., "Product Specification: Ceiling Lighting_6060", Nov. 24, 2010; downloaded from http://www.unityopto.com.tw/ on Mar. 19, 2013; 4 pages.

Zenaro' "Axenia-Modul 600 40W", website description, undated; downloaded from http://europe.zenaro-led.com/en/products/europe/office-lights/itemlist/category/82-axenia on Jun. 22, 2012; 1 page.

Banq Technology Co., Ltd., "300*300 Second Generation LED Panel Light," website description, copyright 2013; downloaded from http://www.banqcn.com/product-141.html on Oct. 28, 2013; email received from website owner on Oct. 9, 2013; 6 pages.

BBF Hitech Intl Co., Ltd, "300x300x11mm," website description, copyright 2010; downloaded from http://www.bbfled.com/productshow_386.html on Oct. 28, 2013; email received from website owner on Sep. 7, 2013; 2 pages.

Bravoled Lighting Manufacturing Co., Limited, "Bravoled, BL-P6-10W ANS," website description, copyright 2010; downloaded from http://www.bravoled.com/html/prs0/t287-310/c565.html on Oct. 28, 2013; email received from website owner on Sep. 26, 2013; 2 pages.

Chinese CleanTech Components Company Ltd, CCTCC, "CTC-300/1200W," website description, undated; downloaded from http://www.cctcc-group.com/productShow.asp?PicID=967 on Oct. 28, 2013; email received from website owner on Sep. 11, 2013; 2 pages.

Ecolux Doubletree, "LED Integrate Super Flatlight," website description, copyright 2003; downloaded from www.ecolux.com.cn/aspcms/product/2013-4-20/292.html on Aug. 30, 2013; 2 pages.

General Electric Company, "GE Lighting E-Catalogue," product brochure, copyright 1997-2013; downloaded from http://catalog.gelighting.com/system/indoor-luminaires/recessed/lumination/?r:emea on Oct. 30, 2013; 4 pages.

General Electric Company, "Infusion LED Modules System," website description, copyright 1997-2013; downloaded from http://www.gelighting.com/LightingWeb/emea/products/highlights/infusion-led-module/overview/#3 on Aug. 8, 2013; 1 page.

Heeber Lighting Co., Ltd., "Heeber 600x600mm, 26w LED panel_Heeber," website description, copyright 2005; downloaded from http://www.heeber.com/cp/html/?5.html on Oct. 28, 2013; email received from website owner on Oct. 8, 2013; 3 pages.

Hilton Electrical Co., Ltd., "Hilton LED Products 2013 List," copyright 2009; Product list received by email from website owner on Aug. 13, 2013; 45 pages.

HK Raymates Electronic Co., Ltd, "RM-COB15/30W-W," website description, undated; downloaded from http://www.raymates.com/index.php/product/view/649.html on Oct. 28, 2013; email received from website owner on Sep. 11, 2013; 1 page.

Keyuan Optoelectronic Co., Ltd, "Your Present Position: Display, KYZM12060," website description, undated; downloaded from http://www.zs-keyuan.com/en/displayproduct.html?prolD=3068225 on Oct. 28, 2013; email received from website owner on Sep. 2, 2013; 2 pages.

Kindom Opto-Electronic Co., Ltd., "300*300 LED Panel Light (side shine)," website description, copyright 2002-2009; downloaded from http://www.kindomled.com/eng/productsview.asp?id=205 on Oct. 28, 2013; email received from website owner on Sep. 9, 2013; 2 pages.

Lamptop Optoelectronics Tech Co., Ltd. "LED Panel Light-LampTop Optoelectronics Technology Co., Ltd," website description, copyright 2009-2013; downloaded from http://www.lamptopled.com/Product/5928161511.html on Sep. 25, 2013; email received from website owner on Sep. 5, 2013; 2 pages.

NGE Technology Limited, "Products Introduction: 300*300mm LED panel light," website description, copyright 2011; downloaded from http://www.nge-led.com/products/NGE-P0303-S18W/ on Oct. 28, 2013; email received from website owner on Sep. 17, 2013; 2 pages.

Ningbo KingsLED Electronics Co., Ltd, "LED ultrathin downlight & LED panel lighting," website description, undated; brochure and email from website owner sent on Jul. 30, 2013; 4 pages.

Ningbo Yoogir Energy Saving Technology Co., Ltd, "LED PL Lamp, LED PLAC, LED Plug Light, LED PL Light, LED Panel Light, LED Tube," website description, copyright 2003-2013; downloaded from http://www.yoogir.com/HK-PL6060.html on Oct. 24, 2013; email received from website owner on Oct. 17, 2013; 2 pages.

Senseled Technology Co., Limited, "RGB Wall & Ceiling & Dance Floor Pannel," website description, undated; downloaded from http://www.senseled.com/product-detail.asp?Product_lld=138&Big_Class_id=93; downloaded from website owner on Oct. 29, 2013; email received from website owner on Oct. 10, 2013; 1 page.

Shanghai Goodsun Lighting Co. Ltd, "A. Ultrathin LED Panel Light 600mm*600mm," website description, copyright 2011-2012; downloaded from http://www.shgoodsun.com/led-panel-light-600-600.html on Oct. 24, 2013; email received from website owner on Oct. 18, 2013; 3 pages.

Shenzhen Aoser Lighting, "SMD2835 led panel light," website description, copyright 2010; downloaded from http://www.aoserled.com/en/Products_detail.asp?I D=326 on Oct. 28, 2013; email received from website owner on Aug. 2, 2013; 2 pages.

Shenzhen BANQ Technology Co., "600*600 front lighting led panel light_Shenzhen Banq Technology Co., Ltd," website description, copyright 2013; downloaded from http://www.banqcn.com/product-139.html on Oct. 28, 2013; email received from website owner on Aug. 5, 2013; 6 pages.

Shenzhen Boyao Optoelectronic Technology Co., Ltd, "Shenzhen Boyao Optoelectronic Technology Co., Ltd.—LED High Bay Light, LED Panel Light," website description, copyright 1999-2013, downloaded from boyao-tech.en.alibaba.com on Sep. 9, 2013; email received from website owner on Aug. 29, 2013; 3 pages.

Shenzhen Huadian Lighting Co., Ltd, "Professional Manufacturer of LED Tube, LED Panel Light, LED Down Lights, LED Spotlight, etc.," website description, undated; downloaded from http://www.hd-leds.com/products-detail.php?Prol d=81 on Oct. 28, 2013; email received from website owner on Sep. 2, 2013; 2 pages.

Shenzhen Loevet Lighting Co. Ltd, "Wholesale 600*600mm LED Panel Light Series from Loevet Lighting Co., Ltd in China," website description, copyright 2008-2013; downloaded from http://www.lvt-lighting.com/led-panel-light-36W-600x600mm.html on Oct. 28, 2013; email received from website owner on Sep. 6, 2013; 3 pages.

Shenzhen Wak Optoelectronic Co., Ltd, "High Brightness LED Panel Light 600x600mm," website description, undated; downloaded from http://www.wak-led.com/product/showproduct.php?lang=en&id=111 on Oct. 28, 2013; email received from website owner on Aug. 25, 2013; 2 pages.

Tsanli Lighting Co., Limited, "LED Panels—LED Light Panel_LED Panels-Led Light Panel Manufacturers & Suppliers," website description, copyright 2013; downloaded from http://www.sanli-led.com/LED_panel.aspx on Oct. 28, 2013; email received from website owner on Oct. 14, 2013; 8 pages.

Up-shine Lighting Co., Limited, "LED Panel Lamp, Dimmable LED Light, High Lumen LED Lamp, Up-Shine Lighting," website description, undated; downloaded from http://www.upshineled.com/5-led-panel-lamp.html on Oct. 24, 2013; email received from website owner on Oct. 14, 2013; 4 pages.

(56) References Cited

OTHER PUBLICATIONS

Westpac LED Lighting, Inc., "LED Panel Lights," website description, copyright 2013; downloaded from http://www.westpacled.com/products/led-panel-lights/ on Oct. 30, 2013; 1 page.
Newsen Electronics Technology Limited, "Newsen Technology, LED Manufacturer, LED Commercial Light, LED Home Light, LED Project Light," website description, copyright 2004-2009; downloaded from http://www.newsenlighting.com/productView.asp?Id=162 on Nov. 4, 2013; email received from website owner on Oct. 29, 2013; 3 pages.
Google Translation of DE 202012103430 U1—downloaded from www.google.com/patents on Oct. 18, 2014; 10 pages.
Google Translation of DE 102010006465A1—downloaded from www.google.com/patents on Nov. 1, 2013; 4 pages.
Google Translation of EP 2270387 B1—downloaded from www.google.com/patents on Nov. 5, 2013; 7 pages.
Alite Co., Ltd., "Products/DLC qualified LED panel_Alite co., Ltd-Led tube lighting, Led bulb, Led spotlights lights, Led panel-china Led Lighting, China Led manufacturer," website description, copyright 2008-2013; downloaded from http://www.aliteled.com/a/Prouducts/dlcledpanel/ on Jan. 2, 2014; 2 pages.
Asia-Boslin Optoelectronics Sci & Tech Group Co., Ltd, "600x600mm 40W 5630 Samsung Ultra-Thin Led Panel Light," website description, copyright 2014; downloaded from www.simaoled.com/english/pro_show.asp?mid=2&name=40W%20LED%20Panel%20Light&pc1_id=13&p_id=741&p_name=40W%20LED%20Panel %20Light#123 on Apr. 15, 2014; email received from website owner on Mar. 10, 2014; 7 pages.
Ecother Technology Limited, "LED Panel Light ET-PL-S6060-36W," website description, copyright 2007-2012; downloaded from http://ecother.com/showproducts.php?id=41 on Apr. 1, 2014; 2 pages.
Emerge DDP Engineered LED Solutions, "ProductslEmerge," website description, copyright 2014; downloaded from www.emergelighting.com/products/ on Feb. 19, 2014; 1 page.
HK Kstar Electronic Co., Ltd. "RGB 600*600 LED Panel Light," website description, undated; downloaded from http://www.kstar-lighting.com/product.asp?id=1675 on Jan. 2, 2014; email received from website owner on Sep. 25, 2013; 3 pages.
International Application No. PCT/US12/38315 International Preliminary Report on Patentability and Written Opinion of the International Searching Authority Dated November 19, 2013 Attached to International Publication No. WO 2012/158894—November 22, 2012.; 12 Pages.
International Application No. PCT/US12/38338 International Preliminary Report on Patentability and Written Opinion of the International Searching Authority Dated November 19, 2013 Attached to International Publication No. WO 2012/15S90S—November 22, 2012.; 11 Pages.
Kili-LED Lighting Limited, "LED Panel Light," website description, undated; downloaded from http://www.kili-led.com/?producten/Product57/ on Apr. 1, 2014; email received from website owner on Mar. 24, 2014; 3 pages.
Light Green International Co., Ltd., "Light Green International Co., Ltdl the Largest Manufacturer of LED Panel Lights in China," website description, copyright 2010-2012; downloaded from http://light-green.cn/english/Product_Catalog_03_01.aspx?id=65 on Apr. 16, 2014; email received from website owner on Apr. 2, 2014; 2 pages.
OPUS Technology Development Co., Ltd., "600x1200mm LED Panel Light SOW," website description, undated; downloaded from http://www.opus-led.com/600x1200mm-LED-Panel- Light-SOW.html on Mar. 12, 2014; email received from website owner on Mar. 10, 2014; 3 pages.
QuarkStar, "Light Shaping: An Innovative New Approach for SSL Luminaires," presentation from Strategies in Light conference on 2/25/27/2014, undated; 32 pages.
Shenzhen CREP Optoelectronics Co., Ltd., "CREP Optoelectronic Co., Ltd.," website description, copyright 2010-2011; downloaded from http://www.crep-led.com/EN/products.aspx on Nov. 16, 2013; email received from website owner on Nov. 13, 2013; 2 pages.
Shenzhen King Star Opto-Electronic Co., Ltd, "China Ultra-thin Economical LED Panel Light supplier," website description, copyright 2005-2013; downloaded from http://www.ks-light.com/china-id293.html on Apr. 16, 2014; email received from website owner on Apr. 1, 2014; 5 pages.
Shenzhen Magreen Group Co., Ltd., "Shenzhen Magreen Lighting Technology Co., Limited," email attachment received by website owner on Apr. 1, 2014; undated; 3 pages.
Shenzhen Man Jia Technology Limited, "1Sw square led panel light with glass edge," website description, copyright 2011-2012; downloaded from http://www.manjia-lighting.com/detail/1Swsquareledpanellightwithgl assedge.html### on Nov. 16, 2013; email received from website owner on Nov. 16, 2013; 7 pages.
Shenzhen Ming Light Co., Ltd, "Minglight Manufacturing Co; Ltd>>LED Panel Light>>LED Panel Light 600x600 1 S&20&39W, IP54," website description, copyright 2011; downloaded from http://www.minglight.com.cn/LED%20Panel%20Light%20600x600%20%201S&20&39W,%201P54-pii-4S.html on Nov. 16, 2013; email received from website owner on Nov. 14, 2013; 4 pages.
Shenzhen Mj International, "Energy Light Index," website description, undated; downloaded from http://www.energyledlight.com/eindex.asp on Apr. 15, 2014; email received from website owner on Feb. 17, 2014; 1 page.
Shenzhen Ruidisi Lighting Co., Ltd, "RDS-6060-Ruidisi Lighting (HK) Co., Limited," website description, copyright 2013; downloaded from http://www.rds-led.com/Products/Candle_Light_Series/Square_panel_light/rds11.html on Nov. 16, 2013; email received from website owner on Nov. 16, 2013; 2 pages.
Shine Technology Ltd, "Led light-led panel light, led bulb and waterproof led power supply manufacturer in China," website description, copyright 1999-2013, downloaded from http://shinetechnology.en.alibaba.com on Dec. 23, 2013; email received from website owner on Nov. 25, 2013; 3 pages.
Star Light Technology Group (China) Limited, "LED Panel light 1200*600 (Full color)—LED Panel Light—China—STAR," website description, copyright 1995-2013; downloaded from www.starlight-led.com/sdp/865240/4/pd-4460524/6793633-1955803/LED_Panel_light_600_600_Full_colors.html#normal_i mg on Dec. 23, 2013; 2 pages.
Tonya Lighting Technology Co., Ltd., "Tonya Lighting Technology Co., Ltd," website description, copyright 2009; downloaded from http://www.tonyalight.com/Default.aspx?PN:prd_view&ps:&pID=75466 on Nov. 15, 2013; email received from website owner on Nov. 15, 2013; 2 pages.
West Deer Technology Co., Limited, "Product Show," website description, copyright 2013; downloaded from http://wdeer-led.com/html/prs0/t287-310/c556.html on Apr. 15, 2014; email received from website owner on Mar. 3, 2014; 2 pages.
Patent Cooperation Treaty, "Invitation to Pay Additional Fees and, Where Applicable, Protest Fee", partial international search report for international application No. PCT/US2014/033352, mailed Aug. 11, 2014; 6 pages.
Google Translation of DE 102010008359 A1—downloaded from www.google.com/patents on Oct. 17, 2013; 16 pages.
Google Translation of EP 1361391 A2—downloaded from www.google.com/patents on Oct. 17, 2013; 6 pages.
Google Translation of EP 1059484 A1—downloaded from www.google.com/patents on Oct. 17, 2013; 17 pages.
Patent Cooperation Treaty, "Notification of Transmittal of International Search Report and the Written Opinion of the International Searching Authority", international search report for international application No. PCT/US2014/033953, mailed Aug. 13, 2014; 12 pages.
Thomson Scientific translation of WO 2009017117 A1—enclosed with international search report for international application No. PCT/US2014/033953, mailed Aug. 13, 2014; 24 pages.
Google Translation of WO 2012/113005 A1—downloaded from www.google.com/patents on Oct. 17, 2013; 5 pages.

(56) References Cited

OTHER PUBLICATIONS

Patent Cooperation Treaty, "International Preliminary Report on Patentability", written opinion of the international searching authority for international application No. PCT/US2012/038315, mailed Nov. 19, 2013; 12 pages.
Patent Cooperation Treaty, "International Preliminary Report on Patentability", written opinion of the international searching authority for international application No. PCT/US2012/038338, mailed Nov. 19, 2013; 11 pages.
LEDCONN CORP., exhibitor at Lightfair 2014 Jun. 1-5, 2014, "iFIT™ LED Light Panel", website copyright 2014; downloaded from http://ledconn.com/index.php/products/ifit-led-light-panel on Oct. 20, 2014; 5 pages.
The Aurora Group, exhibitor at Lightfair 2014 Jun. 1-5, 2014, VerseTile LED panels, website copyright 1999-2014, downloaded from http://gb.auroralighting.com/Products/Indoor-Luminaires/LED-Flat-Panels on Oct. 20, 2014, 4 pages.
Elumina Technology Inc., exhibitor at Lightfair 2014 Jun. 1-5, 2014, LED Panel Light G3, website copyright 2013, downloaded from http://www.eluminatech.com/pro/list2.php?cid=30&f=30&pa=30 on Oct. 20, 2014, 2 pages.
BrightView Technologies, exhibitor at Lightfair 2014 Jun. 1-5, 2014, Light Management/Angle Management products, website copyright 2014, downloaded from http://www.brightviewtechnologies.com/products/light-management/light-management/page.aspx?id=1129 on Oct. 20, 2014, 2 pages.
Pinnacle Architectural Lighting, exhibitor at Lightfair 2014 Jun. 1-5, 2014, brochure for Linero LED lighting product line, brochure downloaded from http://www.pinnacle-ltg.com/downloads/linero/Linero_Brochure.pdf on Oct. 20, 2014, 20 pages.
TCL LED USA, exhibitor at Lightfair 2014 Jun. 1-5, 2014, LED Panel Light, website copyright 2013, downloaded from http://tclledusa.com/products/led-panel-light/ on Oct. 20, 2014, 3 pages.
Cougar LED Lighting, exhibitor at Lightfair 2014 Jun. 1-5, 2014, 2014 Cougar LED lighting catalog, catalog downloaded from http://www.cougar-lighting.de/en/downloads-english/catalogues.html on Oct. 20, 2014, 20 pages.
Notice of the Reason for Refusal dated Mar. 15, 2016 corresponding to Japanese Patent Application No. 2014-511528, 7 pages.
English Translation of the Notice of the Reason for Refusal dated Mar. 15, 2016 corresponding to Japanese Patent Application No. 2014-511528, 6 pages.
Computer generated English translation of Registered Utility Model No. 3140783, transcribed from the Japan Platform of Patent Information, https://www.jplatpat.inpit.go.jp/web/all/top/BTmTopEnglishPage, on Apr. 11, 2016, 11 pages.
Computer generated English translation of Patent Application Laid-open No. 2011-138731, transcribed from the Japan Platform of Patent Information, https://www.jplatpat.inpit.go.jp/web/all/top/BTmTopEnglishPage, on Apr. 22, 2016, 32 pages.
Office Action dated Apr. 26, 2016 corresponding to U.S. Appl. No. 14/480,262, 18 pages.
Office Action dated May 4, 2016 corresponding to U.S. Appl. No. 14/554,919, 69 pages.
Power Integrations—DER-384—Oct. 2013 https://led-driver.power.com/sites/default/files.PDFFiles/der384.pdf?Adsource=Aden_EEW%3felqTrack=true3futm_source=EEWeb&utm_medium=TechCommunity&utm_term=2014&utm_content=Content&utm_campaign=PowerIntegrations, 41 pages.
Advisory Action dated Jan. 25, 2016 corresponding to U.S. Appl. No. 14/554,919, 4 pages.
Interview Summary dated Apr. 5, 2016 corresponding to U.S. Appl. No. 14/554,919, 12 pages.
Advisory Action dated Mar. 30, 2016 corresponding to U.S. Appl. No. 13/473,929, 4 pages.
Office Action dated Jan. 22, 2016 corresponding to U.S. Appl. No. 14/248,197, 10 pages.
Office Action dated Mar. 9, 2016 corresponding to U.S. Appl. No. 14/254,822, 11 pages.
Examination Search Report dated Dec. 11, 2015 corresponding to Canadian Patent Application No. 2,835,213, 3 pages.
Applicant-Initiated Interview Summary dated Mar. 18, 2016 corresponding to U.S. Appl. No. 14/480,772, 3 pages.
Office Action dated Dec. 18, 2015 corresponding to U.S. Appl. No. 14/480,772, 16 pages.
Notice of Allowance and Fee(s) Due dated Apr. 5, 2016 corresponding to U.S. Appl. No. 14/618,665, 14 pages.
Google Translation of CN 201628158—downloaded from www.google.com/patents on Sep. 22, 2015; 3 pages.
European Patent Office, "Communication Pursuant to Article 94(3) EPC", Examination report for European patent application 12726949.6, mailed Feb. 2, 2015; 2 pages.
European Patent Office, Annex to the Communication Pursuant to Article 94(3) EPC , Examination report for European patent application 12726949.6, mailed Sep. 17, 2015; 5 pages.
Non-Final Office Action issued in U.S. Appl. No. 13/473,918 dated Jan. 6, 2014, 19 pages.
Final Office Action issued in U.S. Appl. No. 13/473,918 dated Jun. 4, 2014, 16 pages.
Notice of Allowance issued in U.S. Appl. No. 13/473,918 dated Aug. 11, 2014.
Applicant Initiated Interview Summary dated Jun. 16, 2016 corresponding to U.S. Appl. No. 14/480,262, 4 pages.
Notice of Allowance dated Jul. 29, 2016 corresponding to U.S. Appl. No. 14/480,262, 17 pages.
Non-Final Office Action dated Apr. 24, 2015 corresponding to U.S. Appl. No. 14/554,919, 18 pages.
Final Office Action dated Oct. 7, 2015 corresponding to U.S. Appl. No. 14/554,919, 36 pages.
Non-Final Office Action dated Sep. 1, 2015 corresponding to U.S. Appl. No. 14/254,822, 8 pages.
Non-Final Office Action dated Mar. 30, 2015 corresponding to U.S. Appl. No. 14/618,665, 9 pages.
Non-Final Office Action dated Sep. 15, 2015 corresponding to U.S. Appl. No. 14/618,665, 17 pages.
Final Office Action dated Jul. 14, 2016 corresponding to U.S. Appl. No. 14/480,772, 17 pages.
Non-Final Office Action/Requirement for Restriction/Election issued in U.S. Appl. No. 13/483,918 dated Nov. 14, 2012, 6 pages.
Non-Final Office Action issued in U.S. Appl. No. 13/483,918 dated Apr. 23, 2013, 9 pages.
Notice of Allowance issued in U.S. Appl. No. 13/483,918 dated Nov. 22, 2013, 9 pages.
Non-Final Office Action issued in U.S. Appl. No. 13/473,929 dated Apr. 10, 2015, 26 pages.
Final Office Action issued in U.S. Appl. No. 13/473,929 dated Oct. 22, 2015, 33 pages.
"Lamp Size and Comparison Features." Retrieved on Nov. 9, 2015, from http://www.grainger.com/tps/ lighting_lamp_size_and_feature_comparison_pdf, 1 page.
Wilson, R., "Power Integrations LED driver is 88% efficient for 100W bulb replacement," ElectronicsWeekly.com, Sep. 2015, retrieved from the Internet: http://www.electronicsweekly.com/blost/led-luminaries/power-integrations-led-driver-is-889-efficient-for_100w-bulb-replacement-2012-09/, retrieved on Dec. 7, 2015, 3 pages.
LEDsupply, "Understanding LED Drivers and How to Choose the Right One," undated, downloaded from http://www.ledsupply.com/blog/understanding-led-drivers/ on Jun. 12, 2015, 5 pages.
Notice of Allowance issued in U.S. Appl. No. 14/497,943 dated Jun. 22, 2016, 13 pages.
Non Final Office Action in U.S. Appl. No. 14/497,943 dated Mar. 27, 2015, 9 pages.
Non Final Office Action in U.S. Appl. No. 14/497,943 dated Aug. 28, 2015, 14 pages.
Final Office Action in U.S. Appl. No. 14/497,943 dated Jun. 24, 2015, 8 pages.

(56) References Cited

OTHER PUBLICATIONS

Examiner's Amendment and List of References cited by applicant and considered by examiner in U.S. Appl. No. 14/497,943 dated Jul. 20, 2016, 3 pages.
Power integrations DER-323 18 W A19 LED Driver Using LNK460VG, Figure 1 and figure 2, p. 4 http://www.power.com/sites/default/files/PDFFiles/der323.pdf Jun. 21, 2012, 39 pages.
Non-Final Office Action dated May 26, 2016 corresponding to U.S. Appl. No. 14/517,676, 11 pages.
Notice of Allowance issued in U.S. Appl. No. 15/092,186 dated Jul. 18, 2016, 9 pages.
Notice of Allowance issued in U.S. Appl. No. 15/158,353 dated Jul. 5, 2016, 10 pages.

* cited by examiner

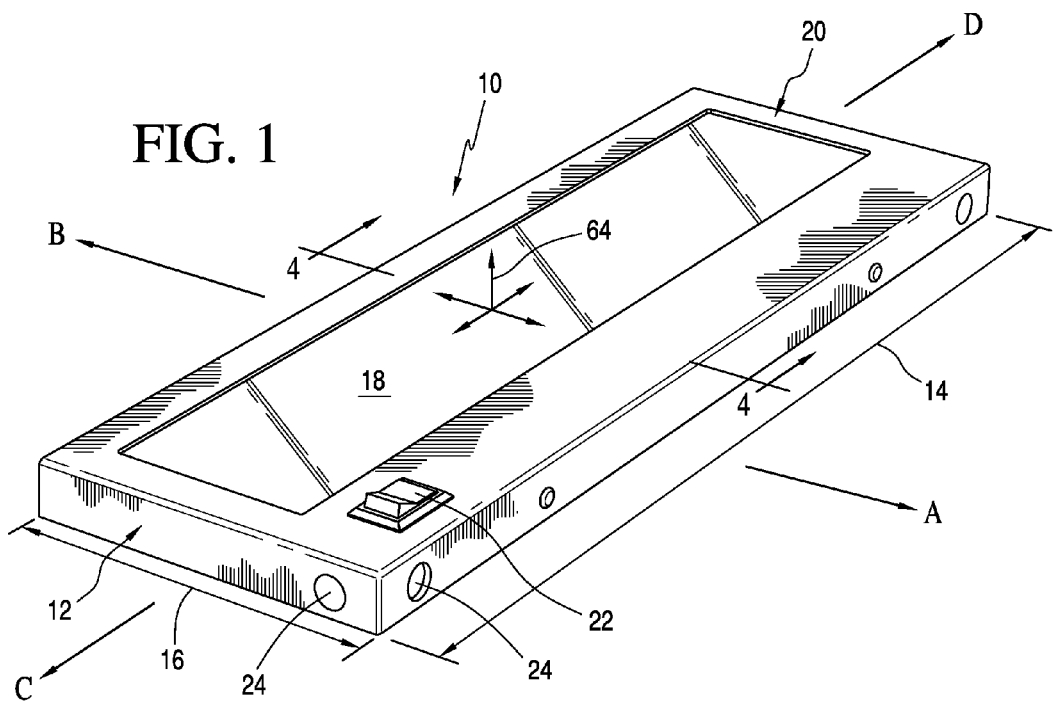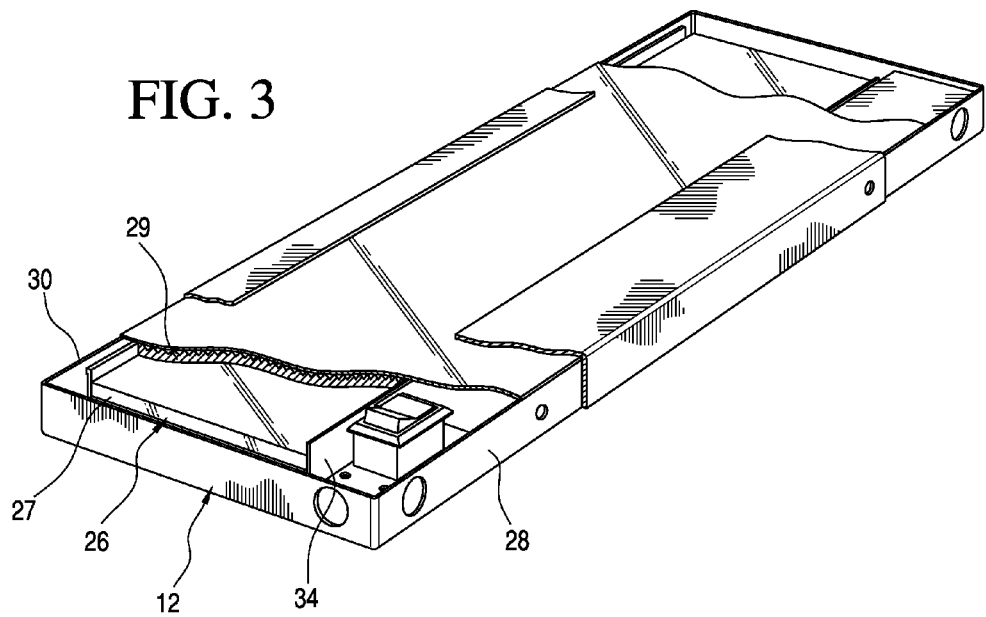

30° Asymmetric

25° Narrow

LIGHTING ASSEMBLY

CROSS REFERENCE TO RELATED APPLICATIONS

The present application claims benefit of U.S. Provisional Application No. 61/812,973 filed Apr. 17, 2013, entitled LIGHTING ASSEMBLY, the entire content of which is hereby incorporated by reference.

INCORPORATION BY REFERENCE

The present application incorporates by reference the following patent applications in their entireties:

U.S. Pat. Pub. No. 20130044512, entitled "FLAT PANEL LIGHTING DEVICE AND RETROFIT KIT," published Feb. 21, 2013 (Ser. No. 13/473,918, filed May 17, 2012); and, U.S. Pat. Pub. No. 2012032062, entitled "FLAT PANEL LIGHTING DEVICE AND DRIVING CIRCUITRY," published Dec. 20, 2012 (Ser. No. 13/473,929, filed May 17, 2012).

BACKGROUND OF THE INVENTION

1. Field of the Invention

The present invention relates generally solid state lighting, such as light emitting diode (LED) lighting, and more particularly to a LED luminaire.

2. Description of the Related Art

LEDs provide several advantages over conventional lighting sources, such as reduced power consumption, higher efficiency, longer life, and enhanced aesthetics. But unlike conventional omnidirectional incandescent, metal halide, sodium, or fluorescent lights, LEDs are directional in nature and require optics specifically configured to optimize the spread of light over a given area in order to meet the light output patterns necessary for many applications, such as under-cabinet lighting.

Under-cabinet lighting is typically added under a cabinet, shelf, or similar surface in order to produce localized lighting on a work surface. Under-cabinet lighting is often added to kitchen and pantry cabinets to provide task lighting on the countertops that is complementary to the general lighting of the room. The underside of cabinets provides an ideal location for task lighting because the light source is near the task and can be easily concealed to avoid glare. Under-cabinet lighting also can reduce shadows cast by the cabinets from the overhead lighting.

As will be disclosed below, the LED under cabinet light fixtures can serve as an efficient alternative to fluorescent and incandescent under cabinet lights that are well known in the prior art. LED under cabinet light fixtures require special optical design to avoid glare, bright spots, and provide enhanced uniformity of illuminance along the length and width of a countertop.

SUMMARY OF THE INVENTION

In one aspect, the light fixture of the present invention includes a frame; an optically transmissive panel assembly; a set of light emitting diodes (LEDs); and driving circuitry. The frame has a frame length measured along a length axis and a frame width measured along a width axis. The frame length is greater than the frame width. The optically transmissive panel assembly is disposed within the frame. The set of light emitting diodes (LEDs) extends along the length axis adjacent an edge surface of the optically transmissive panel assembly. The driving circuitry is disposed within the frame and operatively coupled to the set of LEDs. The driving circuitry is operatively coupled to a power supply external to the light fixture to power the set of light emitting diodes (LEDs). The optically transmissive panel assembly receives light from the set of light emitting diodes (LEDs) and emits light in a patterned luminous intensity distribution.

In a preferred embodiment, optically transmissive panel assembly includes a light guide plate. A patterning optics is adjacent the light guide plate. The patterning optics may be formed, for example, of a micro-prism film or sheet, or a micro-lens film or sheet.

In another embodiment, the optically transmissive panel assembly emits light in an asymmetric light distribution. The asymmetric light distribution may provide maximum luminosity in a transverse direction from the light fixture.

In yet another embodiment, the optically transmissive panel assembly emits light in a light distribution with narrowed beam angle.

In a further embodiment, for illuminating an elongate surface, the optically transmissive panel assembly has a diffusion angle for light emitted in a longitudinal direction, which is different than a diffusion angle for light emitted in a transverse direction. In one application of that embodiment, an array of light fixtures comprise downlights for illuminating the elongated surface below the light fixtures, the light fixtures being oriented with the length axis of each light fixture substantially parallel to a long axis of the elongated surface.

In a further embodiment, the light fixture is located adjacent an edge of an object, and the optically transmissive panel assembly emits light with maximum luminous intensity at an angle toward a location in front of the object.

In another broad aspect, the light fixture of the present invention includes a frame; a set of light emitting diodes (LEDs) within the frame; and, driving circuitry. The frame includes a first edge wall and a second edge wall. A first edge channel is defined within said frame adjacent said first edge wall, and a second edge channel is defined within said frame adjacent said second edge wall. Driving circuitry is disposed within said first edge channel and is operatively coupled to the set of LEDs, the driving circuitry being operatively coupled to a power supply external to the light fixture to power the set of light emitting diodes (LEDs). The driving circuitry comprises a first circuitry segment disposed within the first edge channel, and a second circuitry segment disposed within the second edge channel and in electrical communication with the first circuitry segment.

In one embodiment, the first circuitry segment and the second circuitry segment each comprise a printed circuit board, with components arrayed serially along the length of the printed circuit board. The first circuitry segment may be oriented vertically within the first edge channel. The first circuitry segment may be mounted to the first edge wall with a heat dissipating layer between the printed circuit board and first edge wall.

In another embodiment, the frame includes a third edge wall, and a third edge channel is defined adjacent to the third edge wall. The driving circuitry further includes a third circuitry segment disposed within the third edge channel and in electrical communication with the second circuitry segment.

These and further features of the disclosed technology will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIG. 1 is a perspective illustration of an embodiment of the light fixture of the present invention.

FIG. 3 is a perspective illustration of the light fixture of FIG. 1, shown cutaway to reveal certain components thereof.

DETAILED DESCRIPTION OF THE INVENTION

Figure 2:
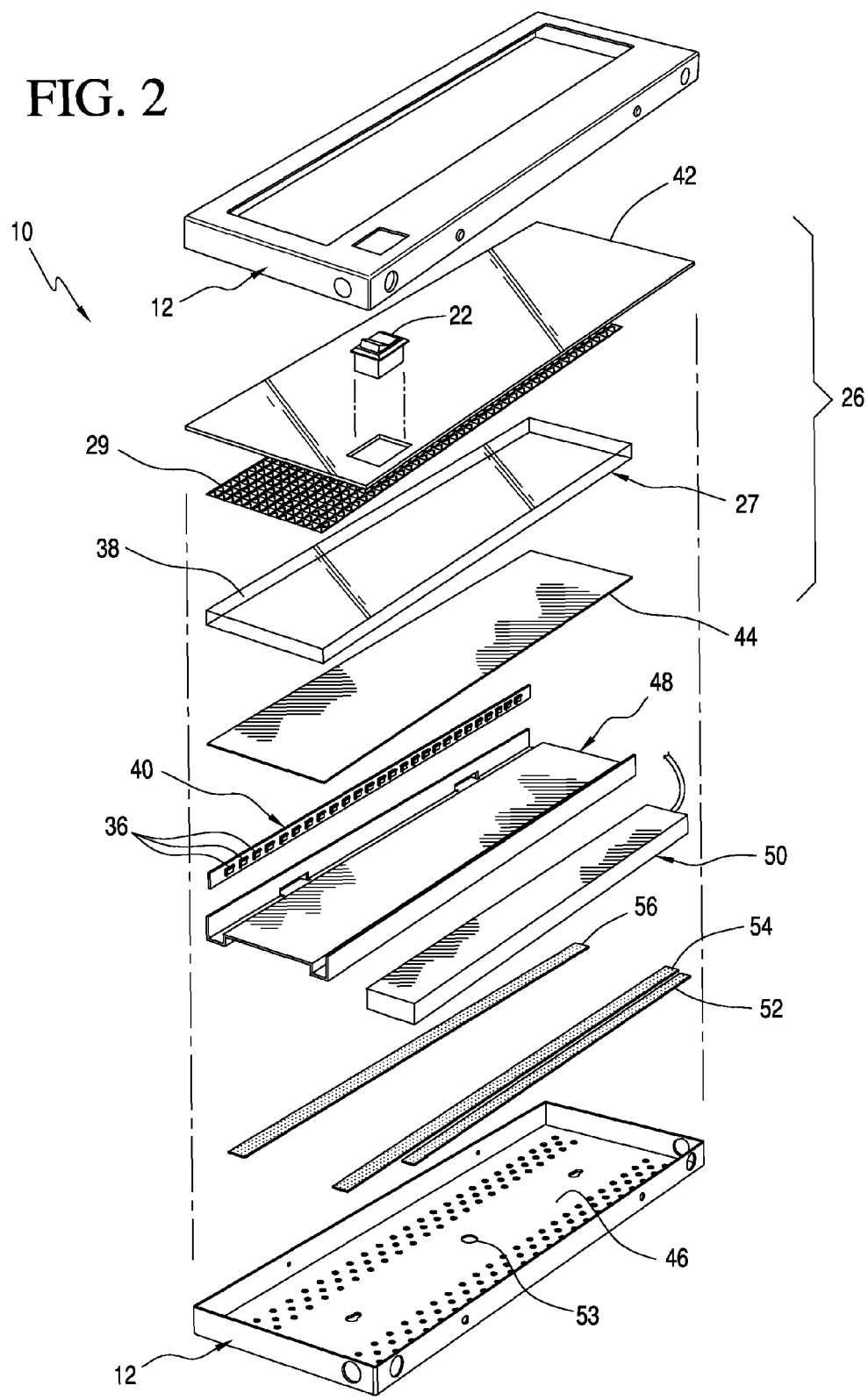
FIG. 2 is an exploded perspective view of the light fixture of FIG. 1.

Referring now to the drawings and the characters of reference marked thereon, FIGS. 1-4 illustrate an exemplary embodiment of the light fixture of the present invention, designated generally as 10. As can be easily seen in FIG. 1, the light fixture 10 includes a frame 12 having a frame length measured along a length axis 14 and a frame width measured along a width axis 16. The frame 12 provides structural support for the various components of the light fixture 10. The frame length is greater than the frame width.

Light is emitted from an emission area 18 at a front surface of the light fixture 10. The emission area 18 has a substantially rectangular aperture; wherein "aperture" indicates linear dimension(s) of the emission area including a first dimension along the length axis (i.e. aperture length) and a second, shorter dimension along the width axis (i.e. aperture width). Light emitted from emission area 18 may travel along a normal 64 to the emission area, or may travel in an off-normal direction. Axes A and B, directed away from the long edges of the light fixture 10, are parallel to the width axis 16. Axes C and D, directed away from the short edges of the light fixture 10, are parallel to the length axis 16. As used in this patent application, a "transverse direction" indicates a direction that deviates from normal 64 in a direction that is out of the plane that includes the normal 64 and at least one of the axes C and D; for example, directions A and B. As used in this patent application, a "longitudinal direction" indicates a direction that deviates from normal 64 in a direction that is out of the plane including the normal 64 and at least one of the axes A and B; for example, directions C and D. It should be noted than a transverse direction or a longitudinal direction need not be perpendicular from normal 64 but may be at an acute angle from the normal 64, and that emitted light may travel along an axis that deviates from normal 64 in both a transverse direction and longitudinal direction.

Exterior features of the frame 12 include a bezel portion 20 of the frame surrounding the emission area 18. As described herein, the bezel 20 may serve as a cover structure for interior components of light fixture 10. The front surface of the frame 12 may include a switch 22. Additionally, appropriate openings 24 and/or other cutaways may be provided for access by wires or other electrical connectors, such as wiring carrying AC power in, wiring carrying DC power in, and/or wiring carrying DC power out.

Figure 4:
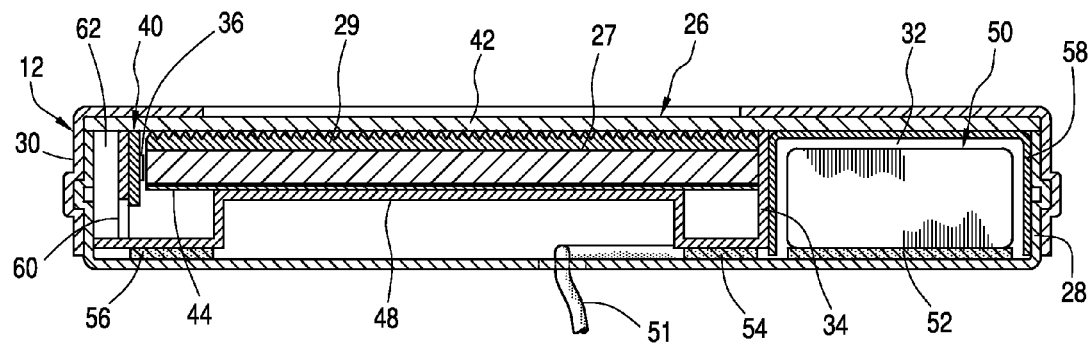
FIG. 4 is a cross-sectional view of the light fixture, taken along line 4-4 of FIG. 1.

Referring to FIGS. 2-4, the frame 12 includes a first edge wall 28 and a second edge wall 30, each extending along the length axis 14. A first edge channel 32 is defined within the frame 12 adjacent the first edge wall 28. The first edge channel 32 is between the first edge wall 28 and a first inner wall 34. The first edge channel 32 preferably has a width of 18 mm or less, in some embodiments 15 mm or less, and in certain (most compact) embodiments 12 mm or less.

As described herein the driving circuitry 50, shown in highly schematic form in FIG. 2, may have a compact configuration compatible with narrow widths of first edge channel 32 as described above. For example, driving circuitry may have dimensions of approximately 20 centimeters in length, approximately 15 millimeters of width, and approximately 15 millimeters in height. In a preferred embodiment, the driving circuitry has an elongate aspect ratio, with a ratio of the length of the driving circuitry to the width of the driving circuitry (i.e. length-to-width ratio) of at least ten to one. It will be appreciated that the disclosed technology is not limited to these exemplary dimensions. The first edge channel 32 can take on other dimensions without departing from the scope of the disclosed technology. Such compact driving circuitry 50 can be obtained by employing miniaturized power and/or control boards. Additional techniques for miniaturized driving circuitry are disclosed below.

An optically transmissive panel assembly, designated generally as 26, is disposed within the frame 12. A set of light emitting diodes (LEDs) 36 is disposed within the frame and extends along the length axis 14 in proximity to the second edge wall 30 and adjacent an edge surface 38 (see also FIG. 7) of the optically transmissive panel assembly 26. The optically transmissive panel assembly 26 receives light from the set of LEDs 36 and emits light from the emission area 18.

Figure 7:
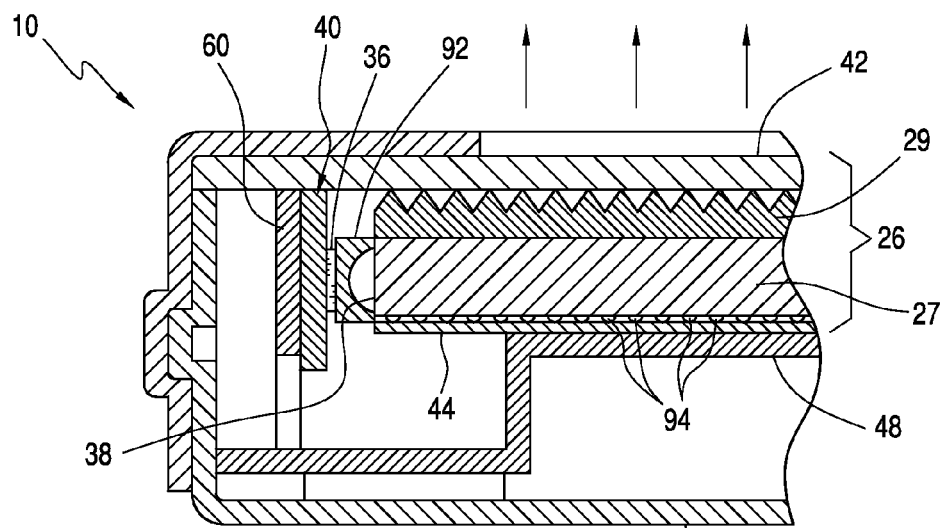
FIG. 7 is a cross-sectional view of a portion of an embodiment of the light fixture, emphasizing the components of the optically transmissive panel assembly.

The LEDs 36 may be supported as part of an LED panel structure, designated generally as 40, such as one or more array, strip, or bar of LEDs 36. Various forms of LEDs packaging may be employed, including for example surface mounted packages that mount LEDs to a printed circuit board. Surface mounting of LEDs typically dissipates heat efficiently. However, it is understood that other LEDs packaging such as pin mounted LEDs, and Chip-on-Board (COB) LEDs, may be utilized. As seen in FIG. 7, a lens 92 or other suitable structure may provide an optical interface between the LEDs 36 and a light guide plate 27 included in optically transmissive panel assembly 26. As used in the present patent application, the term "set of light emitting diodes" (or "LEDs") optionally includes a lens or other optical interface between the LEDs and the optically transmissive panel assembly 26.

In the embodiment shown, the optically transmissive panel assembly 26 is substantially flat. The term "substantially flat optically transmissive panel assembly" as used in connection with the description of the various embodiments, is meant to include optically transmissive panel assemblies having a thickness that is substantially less than the length and width of the optically transmissive panel assembly. As discussed above, the length of the light fixture 10 is greater than its width, and likewise the substantially flat optically transmissive panel assembly has a length greater than its width. Advantageously, light fixture 10 has a substantially flat configuration, but may be of slightly non-uniform thickness due to the configuration of the optically transmissive panel assembly 26 or of another part of the light fixture 10 such as frame 12.

The term "optically transmissive panel assembly" encompasses all light-transmissive, reflective, or refractive structures in the light path from the set of light emitting diodes (LEDs)—but not including these LEDs or any lens or other optical interface adjacent the LEDs—to the emission area 18 (see e.g. the structures shown at 26 in FIG. 7). In one embodiment, the optically transmissive panel assembly includes a light guide plate 27 (LGP) in combination with light-reflective and light-transmissive films, sheeting, or coatings. The optically transmissive panel may include separate component parts assembled during production of light fixture 10, or may comprise a composite structure. In the embodiment of FIG. 2, optically transmissive panel assembly 26 includes light guide plate (LGP) 27, reflective film 44, patterning optics film 29 adjacent a surface of the light guide plate 27 opposite reflective film 44, and diffuser 42 at the front surface (emission area 18) of the optically transmissive panel assembly. In an advantageous embodiment, diffuser 42 comprises a glass or translucent plastic sheet that also serves to seal or water-proof light fixture 10 at its front surface. This glass diffuser sheet 42 may be covered at its edges by bezel 20 and silicone potting material (not shown) may be used under the bezel to support the diffuser sheet 42.

The bezel 20 of the frame 12 comprises a front cover that covers the first edge channel 32 at the front surface of the light fixture 10. The front cover or bezel 20 has a width greater than or equal to the width of the first edge channel. The frame 12 includes a floor 46 disposed at its bottom (or rear). Floor 46 includes or supports a platform 48 for the reflective film 44 and the other components of optically transmissive panel assembly 26.

Driving circuitry, designated generally as 50, is disposed within the first edge channel 32 and operatively coupled to the set of LEDs 36. In a preferred embodiment, driving circuitry 50 is configured to convert an AC input into a DC output suitable for powering the LED panel, as generally disclosed in U.S. Patent Application No. 20120320627 A1, Flat Panel Lighting Device and Driving Circuitry. The driving circuitry 50 is operatively coupled to an AC power supply external to the light fixture 10 (not shown) to power the set of light emitting diodes (LEDs). Power may be provided by a cable or wire 51 provided access through an opening 53 in the floor 46 of the frame 12. Cable 51 may be connected to the external AC power supply through a wall outlet, junction box, or other form of electrical connection.

An adhesive thermal film such as adhesive tape 52 provides thermal and electrical isolation as well as spacing of the bottom of the driving circuitry relative to the floor 46 of the frame 12. Other strips of adhesive tape 54, 56 provide similar features. A metal enclosure 58 isolates driving circuitry 50. A second inner wall 60 extends from the platform 48. The second inner wall 60 supports the LEDs strip 36 and serves to dissipate the heat thereof. A second edge channel 62 is thus defined between the second edge wall and the second inner wall. The second edge channel 62 may be used to provide access to other components of the light fixture 10. Additional edge channels at other sides of light fixture 10 can be provided in a similar manner.

Figure 5:
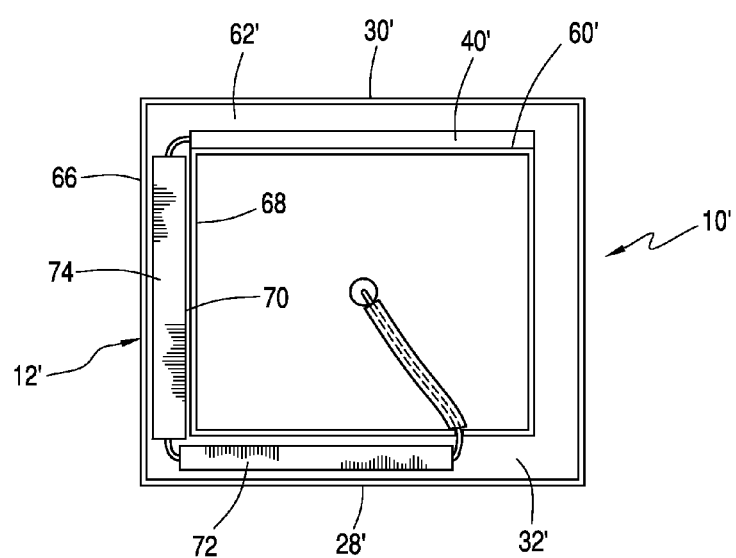
FIG. 5 is a diagrammatic illustration of a light fixture in accordance with one aspect of the disclosed technology in which three edge channels are utilized.
Figure 6:
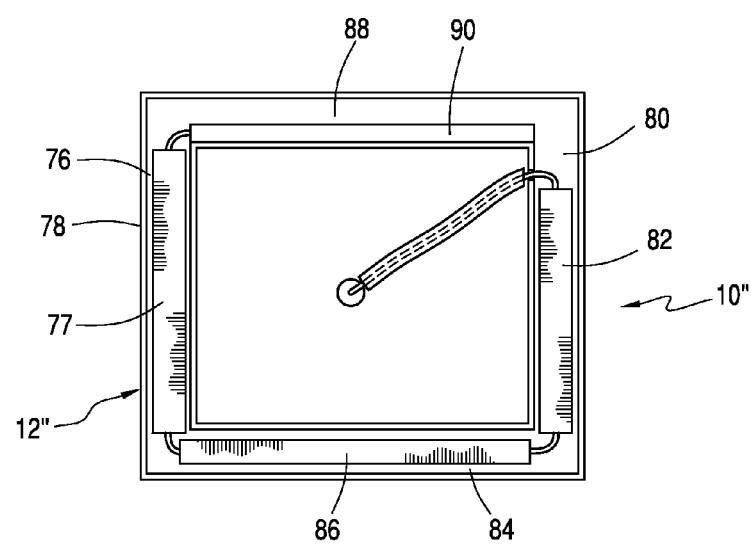
FIG. 6 is a diagrammatic illustration of a light fixture in accordance with one aspect of the disclosed technology in which four edge channels are utilized.

Referring now to FIGS. 5 and 6, alternative lighting fixture embodiments with additional edge channels are shown in schematic views. The lighting fixtures of FIGS. 5 and 6 include driving circuitry in multiple pieces (in FIG. 5—two pieces; in FIG. 6—three pieces) distributed across multiple edge channels of the LED panel lighting fixtures. These multiple-piece driving circuit layouts accommodate longer driving circuits, which may provide additional power and/or additional control functions. Dimensions (length, width and height) described above for driving circuitry in the first edge channel also are suitable for additional driving circuitry segments in additional edge channels.

FIG. 5 shows a lighting fixture 10' including a frame 12' with a first edge wall 28' and a first inner wall 34' defining a first edge channel 32', a second edge wall 30' and a second inner wall 60' defining a second edge channel 62', a third edge wall 66 and a third inner wall 68 defining a third edge channel 70. Lighting fixture 10' has a rectangular form factor; other polygonal form factors are also possible (e.g. octagonal). The first edge channel 32' may contain, for example, a first driving circuitry portion comprising an AC/DC transformer 72. The second edge channel 62' may contain, for example, a LED array 40', and the third edge channel 62' may contain, for example, a second driving circuitry portion comprising a DC power supply 74. Thus, the frame can be configured to house or otherwise support LED power circuitry as well as associated wiring and electrical connections between the power circuitry and the LED arrays.

Referring to FIG. 6, an embodiment 10" including a frame 12" is illustrated, having a fourth edge channel 76 adjacent a fourth edge wall 78, so that a first edge channel 80 may contain, for example, an AD/DC transformer 82, a second edge channel 84 may contain, for example, a first portion 86 of a DC power supply, and the fourth edge channel 76 may contain, for example, a second segment 77 of a DC power supply. The second segment 77 of the DC power supply can be used for example to provide additional control functions such as dimming functions, and driving LEDs with multiple correlated color temperature control (CCT) values. Control functions also may include communications, such as audio or video signals. A third edge channel 88 may contain, for example, an LED array 90. As used herein, use of the ordinal numbers first, second, third, and fourth to designate the edge walls and channels is for the purposes of explanation and illustration; such designations not being for the purposes of limitation. As applied to different embodiments, different ordinal numbers may be used to refer to a corresponding side of the frame (e.g. the side containing an LED array).

Figure 11:
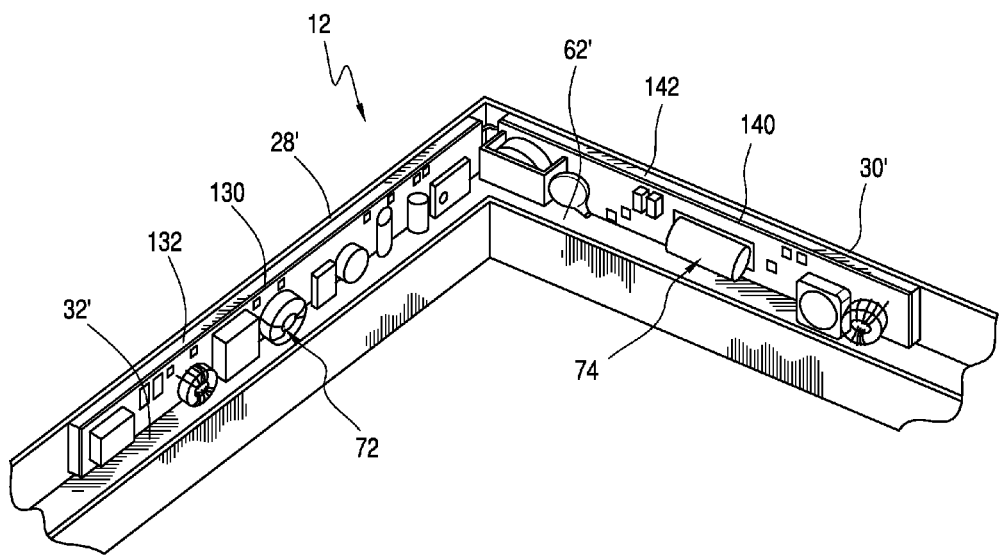
FIG. 11 is a perspective view, partially cutaway of a portion of an embodiment of the light fixture of the present invention in which circuit components are arrayed along the length of the circuit board substrates, in order to reduce width of the circuit board substrates.

FIG. 11 shows an advantageous embodiment of a first driving circuitry portion 72 comprising an AC/DC transformer, and a second driving circuitry portion 74 comprising a DC power supply, generally in accordance with FIG. 5. First driving circuitry portion 72 and second driving circuitry portion 74 are separate pieces in an L-shaped configuration, interconnected by wires or other electrical connectors. First driving circuitry portion 72 includes a printed circuit board substrate 130 with a metal heat sink backing (i.e. heat dissipating layer) 132. The circuit board substrate 130 and the metal heat sink backing 132 are oriented vertically in first edge channel 32', and the metal heat sink backing is mounted against the first edge wall 28' of frame 12. Similarly, second driving circuitry portion 74 includes a printed circuit board substrate 140 with a metal heat sink backing 142. The circuit board substrate 140 and the metal heat sink backing 142 are oriented vertically in second edge channel 62', and the metal heat sink backing 142 is mounted against the second edge wall 30' of frame 12. Metal heat sink backing 132 and metal heat sink backing 142 may comprise aluminum pieces of similar length and width to the dimensions of circuit board substrate 130 and printed circuit board substrate 140. These heat sink backing pieces may include slits (not shown) along their length in order to facilitate heat dissipation.

Various circuit components are mounted to the surface of circuit board substrate 130 facing the interior of first edge channel 32', and various circuit components are mounted to the surface of circuit board substrate 140 facing the interior of second edge channel 62'. Advantageously, these circuit components are arrayed serially, e.g. single-file, along the length of the circuit board substrates, in order to reduce width of the circuit board substrates. Exemplary dimensions of these structures are a width in the range 12-18 mm, and thickness (including the heat sink pieces, printed circuit board, and components) in the range 12-14 mm.

The use of low-profile power supplies such as the multi-piece power supplies of FIGS. 5, 6 and 11 can improve the exterior design of LED panel lighting fixtures, for example in relatively small LED panel lighting fixtures. Referring to FIG. 3, by reducing the width of the first edge channel 32, it is possible accordingly to reduce the width of bezel 20 since the bezel should be as wide as or wider than the edge channel. Likewise, reducing the width of edge channels at other edges of the LED panel fixture 10 permits reduced width of bezel 20 at these edges as well. Typical bezel widths in LED panel lighting fixtures are on the order of 35-40 mm, which can be unsightly in relatively small lighting fixtures. In one example of an improved lighting fixture design based upon a low-profile power supply, an LED panel fixture 150 mm in length by 150 mm in width has a channel width of about 16 mm and a bezel width of 20 mm. In another example, an LED panel fixture 100 mm in length by 100 mm in width has a channel width of about 12 mm and a bezel width of 15 mm.

Turning now to FIG. 7, this view provides an enlarged sectional view of the portion of the light fixture 10 including the optically transmissive panel assembly 26. The light guide plate or LGP 27, is designed to receive light at an edge surface of LGP 27 from an array of light emitting diodes (LEDs), one of which is shown at 40 in this view along with lens 92. Light guide plate 27 redirects the light in a desired pattern to be projected from a front surface of the plate. The LGP may be comprised of an extremely transparent plastic material such as an acrylic or polycarbonate resin; e.g. LGP 27 may be made from poly(methyl methacrylate) (PMMA) resin. On the bottom of the light guide plate a matrix of lines or microstructures 94 can be formed. The microstructures at the bottom of the plate, or particulate additives, direct light received by the light guide plate out of the front of the plate.

One manufacturing technique molds or otherwise forms microstructure elements across a bottom face of the light guide plate. Geometrical and optical properties of microstructure elements can be changed independently, using parametric or non-parametric controls. Size, shape, depth, pitch, density, and angle of rotation of the microstructures all can be controlled to provide greater uniformity of brightness, or other output luminance distribution. For example, light extraction microstructures may be pyramidal, hemispherical, or semiellipsoid, among other forms.

In V-cutting, a V-shaped blade creates a grid on the bottom of the panel by etching a series of vertical and horizontal lines. The depth and spacing of these lines is chosen to optimize the evenness and brightness of light released from the panel. Commonly, in order to achieve uniform brightness, vertical V-grooves are widely spaced when they are close to the light source, but narrowly spaced when they are farther away from the light source. Horizontal V-grooves gradually grow wider and deeper as their distance from the light source increases. These V-groove arrangements provide markedly improved uniformity of brightness at the front surface of the LGP.

In printed-dot light guide plates, a matrix of fine dots is printed onto the LGP using diffusive ink. These dots help scatter the light emitted from the light source. Dot printing is a quicker and cheaper process than molded microstructures or V-cutting, but the printed ink dots are less effective at refracting light and therefore not as bright. Yet another method is to add particulates to the resin itself. These minute particles are scattered throughout the panel and reflect light in all directions when combined with a light source. Similarly to dot printing, the particulates do not reflect as much light out of the front of the panel as V-cutting or microstructures. Other techniques for forming light extraction structures in light guide plates include chemical-etching and laser-etching.

The light guide plate may include reflective surfaces (e.g. coatings) at other side surfaces besides the surface that receives light from the array of light emitting diodes (LEDs), to reflect light incident on these surfaces back into the light guide plate 27. As discussed above, and seen in FIG. 7, a reflective film or reflector 44 may be provided below the bottom surface of the light guide plate 27 to reflect light that is refracted out of the bottom surface back through the light guide plate 27.

The LED panel fixture may include light-transmissive sheeting or film that receives light from a front surface of the light guide plate and transmits light from the emission area of the light fixture. The light-transmissive sheeting or film can be rigid or flexible, and may include a single layer or multiple layers of translucent material. The light transmissive sheeting or film can include a diffuser, which scatters the light received from the light guide plate. Instead of or in addition to the diffuser, the light-transmissive sheeting or film can be configured to modify or otherwise direct the distribution of light received from the reflection panel in a variety of ways (herein called "patterning optics"). The light-transmissive sheeting or films embodiment of FIG. 7 includes both patterning optics 29 adjacent light guide plate 27, and diffuser sheet 42 comprising the outer (front) surface of the optically transmissive panel assembly 26. (As used in this patent application in referring to the patterning optics, the term "adjacent" the light guide plate includes the patterning optics being integral with the light guide plate).

The patterning optics 29 may comprise a prism film such as such as a brightness enhancement film (BEF), or a microprism array. Brightness enhancement films are transparent optical films that focus the light toward a viewing axis, providing a significant increase in brightness along this axis. Microprism arrays, i.e. sheets or films with grids of fine prisms, are well known in LED lighting applications. For example the use of microprism sheets in LED lighting systems is disclosed in U.S. Pat. No. 6,331,915, Lighting Element including Light Emitting Diodes, Microprism sheet, Reflector, and Diffusing agent.

Alternatively, the patterning optics 29 may comprise a micro-lens diffuser. In a patterning optics with micro-lens surface elements, the slope of the surface elements dictates the exit direction of a light ray. In a micro-lens diffuser film, light-steering elements called micro-lenses typically cover the entire exit side. Micro-lens arrays are known to produce uniform scatter patterns with high efficiency. Two key factors affecting luminance of light exiting the micro-lenses is the contour of the micro-lenses, and the pitch between micro-lenses.

A range of patterning optics products is available under the trademark Light Shaping Diffusers (LSD)® from Luminit, LLC, Torrance Calif. Light Shaping Diffusers work on a principle of multi-stage optics in which firstly, the light is collimated to a narrow angle, and then the light is shaped to a desired output angle that can vary from very narrow to wide with no change except for the light shaping diffuser. Secondary optics acting on the LEDs output, such as light guide plates in combination with a brightness enhancing film, are used to narrow and collimate the beam. The Light Shaping Diffusers then acts as tertiary optics to shape the output beam. For example, after an initial stage of collimating the beam angle to 5°, Luminit's LSD® materials can provide a very narrow output of 7° with a 5° diffuser up to 80° with an 80° diffuser. These Light Shaping Diffusers also can shape the beam output from circular to highly elliptical.

Patterning optics materials also are available from Fusion Optix Inc., Woburn Mass., under the trademark AirOptics. AirOptics™ films and sheeting include a variety of micro-lens films and prism films, as well as diffusers and reflecting films, for LED lighting applications. Patterning optics materials from Fusion Optix can be included in the LED panel lighting fixtures of the present invention to provide various patterned luminous intensity distributions described below, including asymmetric light distributions, elliptical light distributions, and narrowed beam angles.

In the embodiment of FIG. 7, the light guide plate 27 receives light from a LED light source 40 including LEDs 36. Light guide plate 27 includes a plurality of microstructures 94 disposed on its bottom surface. Light beams emitted from LEDs 36 enter the light guide plate 27 at the edge surface 38 of the LGP. Then, by means of the microstructures 94 which disrupt the total internal reflection, a portion of the light beams is reflected upward to leave the light guide plate 27 from the front surface of the light guide plate 27. The remaining portion of the light beams leaves the light guide plate from the back surface of the light guide plate, and is reflected upwardly by the reflector 44 to enter into the light guide plate 27 again, and then exit the LGP 27 from its front surface. An illumination angle(s) of light emerging from the LGP front surface is adjusted by the patterning optics 29. The patterning optics 29 and/or the LGP microstructures 27 may be designed to provide a desired luminous intensity distribution of light projected by the LED panel fixture, such as a patterned luminous intensity distribution.

As used in the present patent application, the phrase "patterned luminous intensity distribution" refers to a light output from the LED panel light fixture of the present invention that departs from the luminous intensity observed from an ideal diffuse radiator (sometimes called Lambertian radiance), and that often is tailored to the lighting requirements of particular applications. Examples of patterned luminous intensity distribution include (but are not limited to) the following luminous intensity distributions of an LED panel lighting fixture:

(a) Asymmetric Light Distributions

LED panel fixtures providing asymmetric light distribution at a transverse direction toward one side of light fixture, which directs the light with maximum luminous intensity at an angle toward that side of the light fixture. For example, in the light fixture 10 of FIG. 1, an asymmetric light distribution may provide maximum luminosity at an acute angle from normal 64 emitted from the light fixture generally in the transverse direction A (although not necessarily in that precise direction). As defined in this patent application, asymmetric light distributions do not provide off-normal maximum luminosity at both sides of the light fixture.

Figure 14:
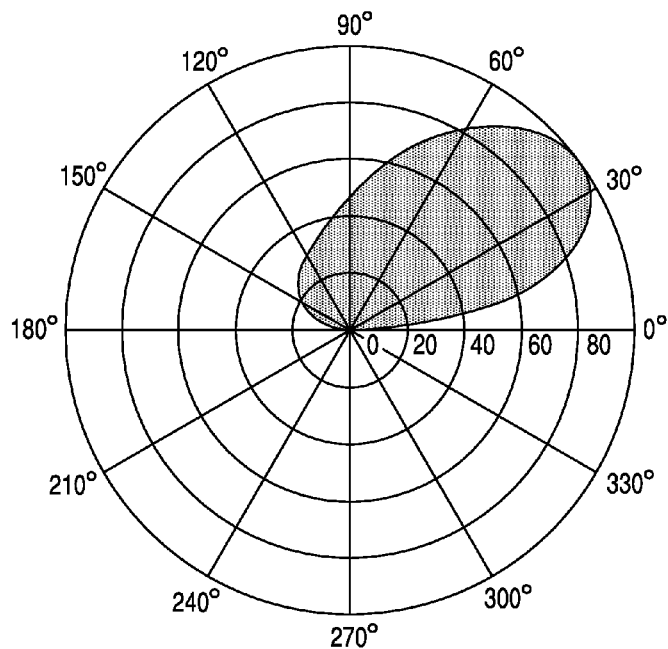
FIG. 14 is a polar graph of candela distribution for an embodiment of the light fixture of the present invention providing an asymmetric light distribution.

FIG. 14 is a polar graph of candlepower distribution for an exemplary asymmetric light distribution. Referring to FIG. 1, this graph indicates luminous intensity in all vertical angles of the LED panel light fixture measured in a plane including the normal 64 and one of the axes A and B; vertical angle 90° corresponds to normal 64.

Various applications using asymmetric light distributions are discussed below. For example, in the under cabinet LED panel light of FIG. 8, the lighting fixtures 105, 110 are located toward the back edge of a countertop 97, and provides a luminous intensity distribution that has a maximum luminous intensity angled toward the center of the countertop (grid 100) rather than at a normal from the light fixture's emission area.

Figure 9:
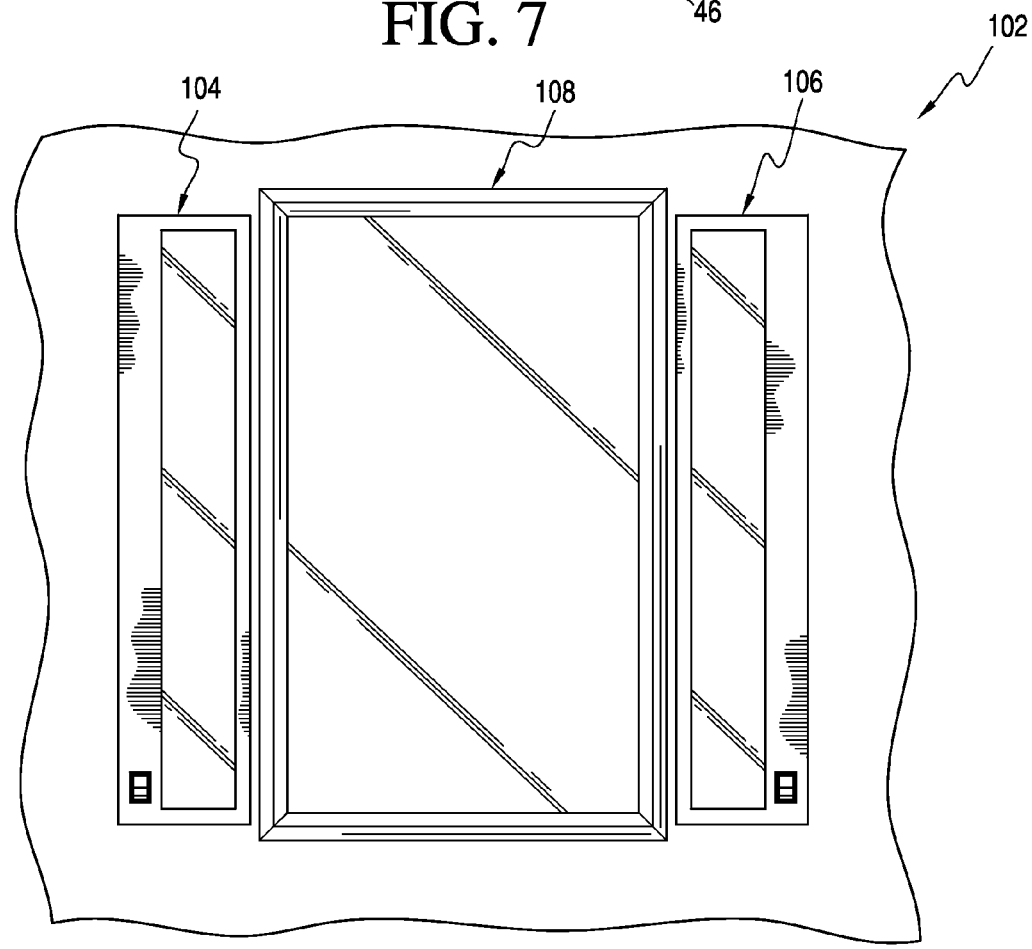
FIG. 9 is a perspective view showing application of the light fixtures of the present invention in a vanity mirror environment.

In another asymmetric lighting application, LED panel lighting fixtures are wall mounted adjacent the edges of an object, such as light fixtures 104, 106 adjacent the vanity mirror 108 of FIG. 9. These lighting fixtures provide a light output to one side of each lighting fixture to direct the light with maximum luminous intensity toward a location in front of the object, such as a viewer in front of the vanity at the center of the mirror.

Figure 12:
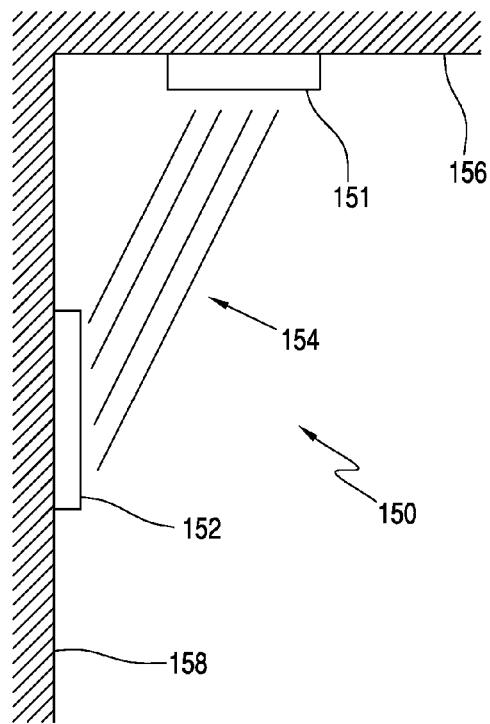
FIG. 12 is a schematic view showing application of the light fixtures of the present invention in a wall wash lighting environment.
Figure 13:
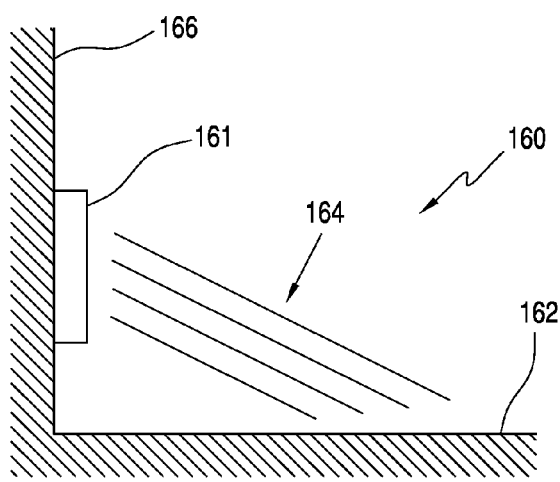
FIG. 13 is a schematic view showing application of the light fixtures of the present invention in a step lighting environment.

In further asymmetric lighting applications, vertical or horizontal surfaces can be "washed" with light, with the highest intensity light aimed near a portion of the washed surface offset from a normal to the LED panel lighting fixture. One such application is the wall wash lighting system 150 shown in the schematic view of FIG. 12. Light fixture 151 (here viewed at one of its short edges) is mounted on ceiling 156, and emits light 154 angled downward in a transverse direction to illuminate painting 152 or other object mounted on wall 158. Another such application is the step lighting system 160 shown in the schematic view of FIG. 13. Light fixture 161 (here viewed at one of its short edges) is mounted on wall 166, and emits light 164 angled downward in a transverse direction to wash step 162 or other walkway with light.

(b) Light Distributions with Major and Minor Beam Widths

Beam angle (also sometimes called beam diameter or beam width) is the degree of width that light emanates from a light source. In lighting, beam angle is the angle between those points on opposite sides of the beam axis where the intensity drops to 50% of maximum, sometimes called full width at half maximum (FWHM). The term beam diameter usually refers to the beam width of a beam of circular cross section, but may also refer to a beam of elliptical cross section. As further described below with reference to FIG. 8, the light fixture of the invention may provide an elliptical luminous intensity distribution in which the major axis extends along a longitudinal direction, and the minor axis extends along a transverse direction. An elliptical luminous intensity distribution has a different diffusion angle (i.e. exit angle of collimated light through a material) for light exiting the emission area 18 in the longitudinal direction, than for light exiting the emission area 18 in the transverse direction (FIG. 1).

(c) Light Distributions with Narrow Beam Angles

Another type of patterned luminous intensity distribution that may be achieved using patterning optics in the LED panel light fixtures of the present invention is narrow beam angles, which are sometimes achieved in other types of lamps or luminaires through the use of reflector systems. Lamp type terms such as "spot" and "flood" have been adapted to LED lamps. For example, ENERGY STAR® Program Requirements for Integral LED Lamps provide that for LED lamps falling within the guidelines, suppliers are required to state the beam distribution in terms of Spot, Narrow Flood, or Flood, based upon the following definitions: "Spot" for 10°-20° beam angle; "Narrow flood" for 20°-30° beam angle; and "Flood" for greater than 30° beam angle.

Figure 15:
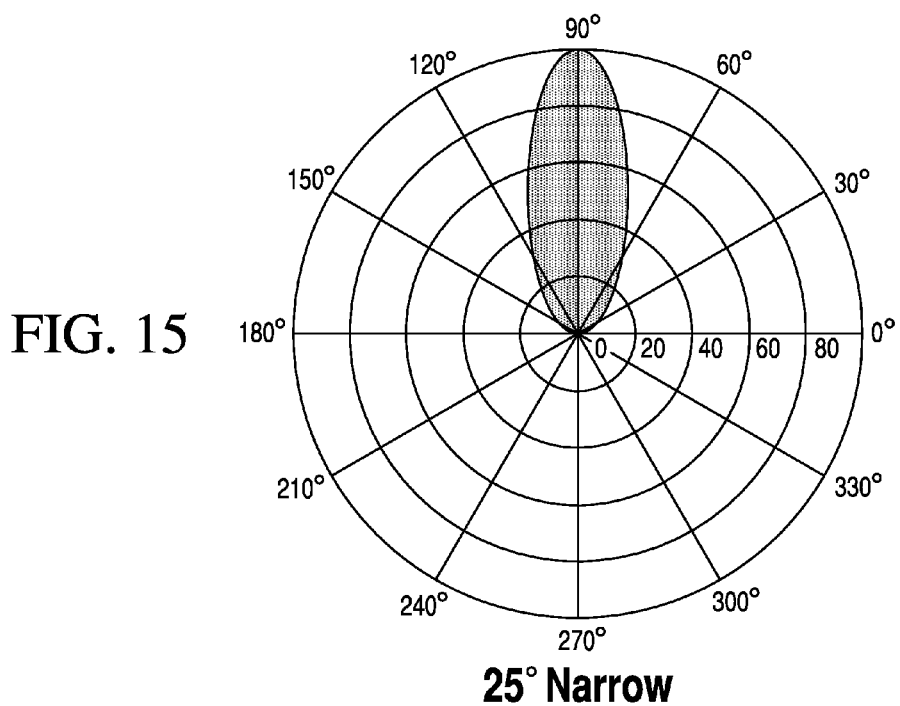
FIG. 15 is a polar graph of candela distribution for an embodiment of the light fixture of the present invention providing a 25° narrow light distribution.

FIG. 15 is a polar graph of candlepower distribution for a 25° narrow light distribution. Referring to FIG. 1, this graph indicates luminous intensity in all vertical angles of the LED panel light fixture measured in a plane including the normal 64 and one of the axes A and B; vertical angle 90° corresponds to normal 64.

(d) Glare Control

Yet another way in which the LED panel lighting fixtures of the invention can control luminous intensity distribution is to limit glare. Glare can be categorized into different visual effects, for example blinding glare, disability glare, and discomfort glare. LED panel lighting fixtures 10 can avoid or reduce unwanted levels of glare by diffusing the fixtures' light output and by redirecting light away from the viewer.

Figure 8:
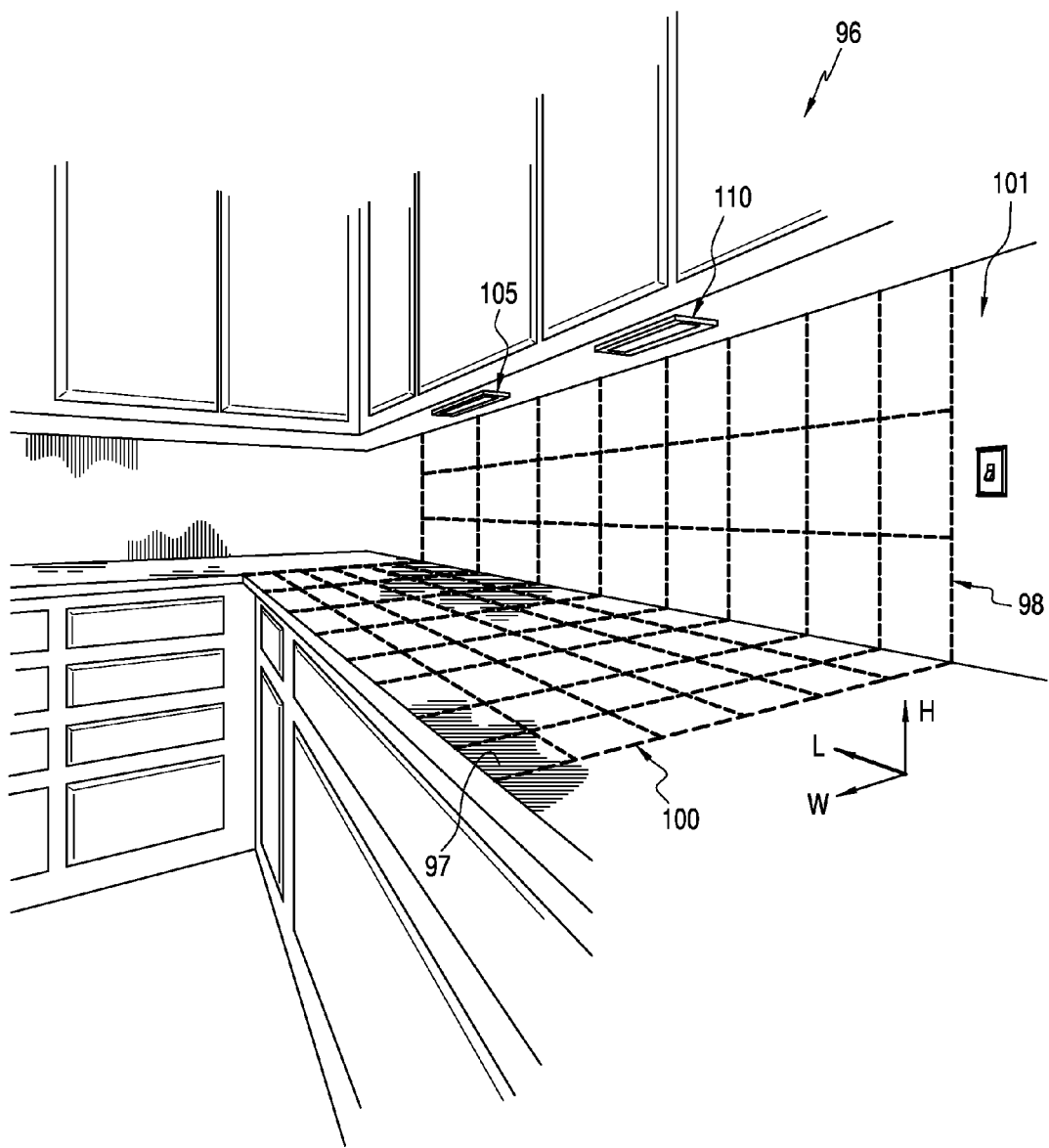
FIG. 8 is a perspective view showing application of the light fixtures of the present invention in an under cabinet environment.

Referring now to FIG. 8, an application of the present invention in an under cabinet lighting installation is designated generally as 96. This installation includes LED panel lighting fixtures 105, 110 facing downwardly over countertop 97 and mounted in a spaced apart configuration under a cabinet in the vicinity of a back wall or backsplash 101. Installation 96 is characterized by a length axis L along the countertop, width axis W across the countertop, and height axis H above the countertop. With reference to these coordinates, the LED panel lighting fixtures 105, 110 are separated by $L_1$ (center-to-center spacing), countertop 97 has a width $W_1$ from the backsplash to its front edge, and lighting fixtures 105, 110 are placed at height $H_1$ above countertop 97 as measured at the front surface (emission area) of these lighting fixtures.

Light outputs of the LED panel lighting fixtures as received at the countertop 97 and backsplash 101 can be quantified using photometry, by illuminance or the total luminous flux incident on these surfaces per unit area. Dotted grids 98, 100 respectively overlaid at the backsplash and at the countertop schematically illustrate areas (rectangular zones) of these two surfaces at which light is received from lighting fixtures 105, 110.

Advantageously, lighting fixtures 105 and 110 each provide light output with patterned luminous intensity distribution. In a first embodiment, fixtures 105 and 110 provide a substantially elliptical illuminance pattern at countertop 97 with major and minor beam widths beam widths, as measured respectively along the length axis L (longitudinal direction of the light fixtures) and width axis W (transverse direction of the light fixtures). Further, fixtures 105 and 110 provide an overlapping luminous intensity distribution so that in zones within grid 100 that receive overlapping illumination from the two fixtures, the total illuminance includes significant light output contributions from both lighting fixtures. The overall effect of the physical layout and light outputs of lighting fixtures 105 and 110 is that these fixtures provide a more uniform light distribution along countertop 97.

In a second embodiment of patterned luminous intensity distribution for under cabinet light installation 96, LED lighting fixtures 105 and 110 are mounted near the back wall 101. A normal from the emission area, or nadir (e.g. see also numeral designation 64 in FIG. 1), extends downwardly along axis H and intersects the grid 98 near the back edge of the grid. In order to provide more uniform illuminance across the width of countertop 97, and to limit illuminance at the backsplash (grid 98), light fixtures 105 and 110 provide an asymmetric luminous intensity distribution with maximum luminous intensity in a transverse direction near the middle of grid 100 rather than at the nadir near the back edge of the grid 100. This second embodiment of patterned luminous intensity distribution may be combined with the first embodiment of patterned luminous intensity distribution for an under cabinet LED panel lighting system.

Referring now to FIG. 9, utilization of the present invention with a vanity mirror is illustrated, designated generally as 102. Two LED panel fixtures 104, 106 are shown mounted adjacent left and right edges of a vanity mirror 108. Each of the LED panel fixtures 104, 106 provides a luminous intensity distribution skewed in a transverse direction toward the side of that lighting fixture that faces the vanity mirror 108. The luminaire angle(s) of maximum luminous intensity for each lighting fixture is directed toward a location centered in front of the mirror 108, rather than to a location in front of the respective lighting fixture. This off-normal luminous intensity distribution reduces glare for persons in the general vicinity of the LED panel lighting fixtures 104, 106.

Figure 10:
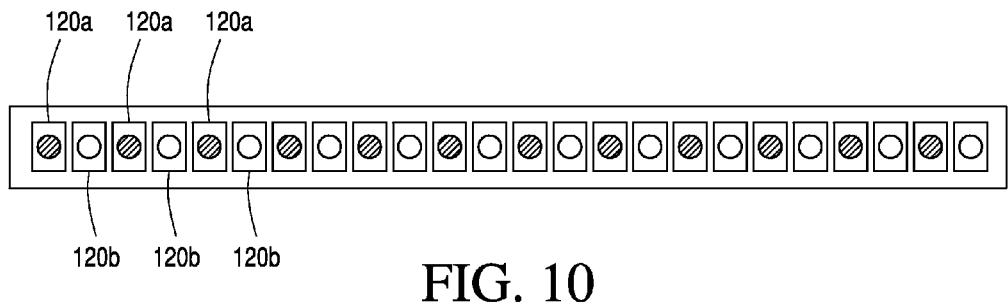
FIG. 10 is a diagrammatic illustration of a LED array in accordance with one aspect of the disclosed technology.

Turning now to FIG. 10, another aspect of the disclosed technology will be described. Color of a white lamp can vary from yellowish, to neutral white, to bluish; the correlated color temperature (or "CCT") rating of a lighting fixture is a general measure of its "warmth" or "coolness" of appearance. In accordance with one exemplary embodiment, the LED panel light fixture can include multiple sets of LEDs, wherein each set corresponds to a given correlated color temperature. For example, the light fixture can include a first set of LEDs 120a with a first CCT, and a second set of LEDs 120b with a second CCT, along with driving circuitry operatively coupled to the first set of LEDs 120a and the second set of LEDs 120b. The first driver and second driver may be located, for example, in the driver circuitry shown at 76 in FIG. 6, or other suitable location.

Referring again to FIG. 8, in an under cabinet lighting installation, appropriate light color depends on the surface(s) of countertop 97 to be illuminated. For wood tones, wood-colored tiles, copper-tones, or warm-toned surfaces, it is desirable to have a light with correlated color temperatures (CCTs) in the 2700-3500 K range (warm tone). For glass tiles, CCTs in the 3500-5000K range are appropriate (neutral or cool tone). For a countertop 97 having multiple surface materials along the axis L, color control can be achieved by providing multiple zones of illumination of various CCT's, depending on the nature of the countertop surface in each zone.

To illustrate aspects of the disclosed technology in a clear and concise manner, the drawings may not necessarily be to scale and certain features may be shown in somewhat schematic form.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A light fixture, comprising:
   a) a frame having a frame length measured along a length axis and a frame width measured along a width axis, wherein the frame length is greater than the frame width, wherein the frame defines a first channel extending along the length axis at a first edge of the frame, and a second channel extending along the length axis at a second edge of the frame opposite to the first edge of the frame;
   (b) an array of light emitting diodes (LEDs) disposed within the first channel extending along the length axis at the first edge of the frame;
   (c) an optically transmissive panel assembly disposed within the frame, wherein the optically transmissive panel assembly light receives light from the array of light emitting diodes (LEDs) at an edge of a light guide plate of the optically transmissive panel assembly adjacent the first channel;
   d) driving circuitry disposed within the second channel extending along the length axis at the second edge of the frame and operatively coupled to the set of LEDs, the driving circuitry operatively coupled to an AC power supply external to the light fixture to power the set of light emitting diodes (LEDs);
   wherein the optically transmissive panel assembly emits light from a patterning optics film adjacent a surface of the light guide plate at an emission area of the optically transmissive panel assembly in an asymmetric light distribution, and wherein the asymmetric light distribution directs the light with maximum luminous intensity in a transverse direction toward one of a first side of the light fixture off the first edge of the frame or a second side of the light fixture off the second edge of the frame.

2. The light fixture of claim 1 wherein the patterning optics film comprises a micro-prism film.

3. The light fixture of claim 1, wherein the patterning optics film comprises a micro-lens diffuser film.

4. The light fixture of claim 1, wherein the driving circuitry has a length and a width, wherein a length-to-width ratio thereof is at least 10 to 1.

5. The light fixture of claim 4, wherein the driving circuitry comprises a printed circuit board, with components arrayed serially along the length of the printed circuit board.

6. The light fixture of claim 1, for illuminating an elongate surface, wherein the optically transmissive panel assembly has a diffusion angle for light emitted in a longitudinal direction, that is different than a diffusion angle for light emitted in the transverse direction.

7. The light fixture of claim 1, wherein the optically transmissive panel assembly emits the light in the asymmetric light distribution with the maximum luminous intensity light aimed at a surface offset from a normal to the light fixture in the transverse direction.

8. The light fixture of claim 1, wherein the light fixture is located adjacent an edge of an object, and the optically transmissive panel assembly emits light with maximum luminous intensity in the transverse direction toward a location in front of the object.

9. A light fixture, comprising:
   a) a frame including a first edge wall and a second edge wall, wherein a first edge channel is defined within said frame adjacent said first edge wall at a first side of the frame and a second edge channel is defined within said frame adjacent said second edge wall at a second side of the frame, wherein the first side of the frame and the second side of the frame form a corner of the frame;
   b) a set of light emitting diodes (LEDs) disposed within the frame;
   c) driving circuitry comprising a first printed circuit board disposed within said first edge channel, said first printed circuit board operatively coupled to an AC power supply external to the light fixture and configured to convert an AC input into a DC output; a second printed circuit board disposed within said second edge channel and operatively coupled to said set of light emitting diodes (LEDs) to power the LEDs; and an electrical connector between the first printed circuit board and the second printed circuit board at the corner of the frame.

10. The light fixture of claim 9, wherein the frame is substantially rectangular in form, the first edge channel extends along a length axis, and the second edge channel extends along a width axis.

11. The light fixture of claim 9, wherein the frame has a thickness of 18 mm or less.

12. The light fixture of claim 9, wherein the first printed circuit board disposed within the first edge channel has a length and a width, wherein a length-to-width ratio thereof is at least 10 to 1.

13. The light fixture of claim 12, wherein the first printed circuit board is oriented vertically within the first edge channel.

14. The light fixture of claim 13, wherein the first printed circuit board is mounted to the first edge wall of the frame with a heat dissipating layer between the first printed circuit board and first edge wall.

15. The light fixture of claim 9, wherein each of the first printed circuit board and the second printed circuit board has components arrayed serially along a length of the respective printed circuit board.

16. The light fixture of claim 9, further comprising an optically transmissive panel assembly disposed within the frame, said optically transmissive panel assembly comprising a light guide plate, wherein the set of light emitting diodes (LEDs) are disposed adjacent an edge surface of the light guide plate.

17. The light fixture of claim 9, wherein the first printed circuit board includes an AC/DC transformer, and the second printed circuit board comprises a DC power supply with one or more control function.

18. The light fixture of claim 17, wherein the one or more control function of the second printed circuit board include one or more of dimming, and driving LEDs with multiple correlated color temperature (CCT) values.

19. The light fixture of claim 9, wherein the set of light emitting diodes (LEDs) are disposed within the frame at a third edge of the frame.

* * * * *